US012144337B2

(12) United States Patent
Weidenbach et al.

(10) Patent No.: US 12,144,337 B2
(45) Date of Patent: Nov. 19, 2024

(54) AGRICULTURAL IMPLEMENT SUSPENSION SYSTEM

(71) Applicant: Raven Industries, Inc., Sioux Falls, SD (US)

(72) Inventors: Alex Weidenbach, Sioux Falls, SD (US); Jesse Lee Wagers, Harrisburg, SD (US); John D. Preheim, Beresford, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

(21) Appl. No.: 18/172,671

(22) Filed: Feb. 22, 2023

(65) Prior Publication Data

US 2023/0263150 A1    Aug. 24, 2023

Related U.S. Application Data

(63) Continuation of application No. 16/510,831, filed on Jul. 12, 2019, now Pat. No. 11,602,142.

(Continued)

(51) Int. Cl.
*A01M 7/00* (2006.01)
*A01B 63/10* (2006.01)

(52) U.S. Cl.
CPC ........... *A01M 7/0057* (2013.01); *A01B 63/10* (2013.01); *A01M 7/0089* (2013.01)

(58) Field of Classification Search
CPC .............. A01M 7/0057; A01M 7/0089; A01M 7/0053; A01M 7/005; A01M 7/00; A01B 63/10; A01B 63/02; A01B 63/00
See application file for complete search history.

(56) References Cited

U.S. PATENT DOCUMENTS 5,725,066 A    3/1998 Beard et al.
6,029,764 A    2/2000 Schubert
(Continued)

FOREIGN PATENT DOCUMENTS

EP         3653052 A1    5/2020
WO    WO-2020014691 A1    1/2020

OTHER PUBLICATIONS

"U.S. Appl. No. 16/510,831, Non Final Office Action mailed Aug. 9, 2022", 20 pgs.
(Continued)

*Primary Examiner* — Christopher J. Novosad
(74) *Attorney, Agent, or Firm* — Schwegman Lundberg & Woessner, P.A.

(57) ABSTRACT

A semi-active suspension system includes a suspension element having a damping coefficient range. The suspension element optionally includes an implement end and a chassis end. The semi-active suspension system includes a suspension control circuit in communication with the suspension element. The suspension control circuit optionally includes a kinematic assessment circuit in communication with one or more sensors. The kinematic assessment circuit is configured to measure or determine kinematic characteristics of one or more of the agricultural implement and the chassis. The suspension control circuit optionally includes a damping control circuit, and the damping control circuit generates a specified damping characteristic based on the measured or determined kinematic characteristics. The damping control circuit optionally directs the suspension element to operate within the damping coefficient range based on the specified damping characteristic.

22 Claims, 12 Drawing Sheets

Related U.S. Application Data

(60) Provisional application No. 62/697,394, filed on Jul. 12, 2018.

(56) References Cited

U.S. PATENT DOCUMENTS

| | | | |
|---|---|---|---|
| 6,343,661 | B1 | 2/2002 | Thompson et al. |
| 8,646,702 | B2 | 2/2014 | Barker |
| 8,843,283 | B2 | 9/2014 | Strelioff et al. |
| 8,942,893 | B2 | 1/2015 | Rosa et al. |
| 9,010,451 | B2 | 4/2015 | Dames et al. |
| 9,148,995 | B2 | 10/2015 | Hrnicek et al. |
| 9,226,490 | B2 | 1/2016 | Keye |
| D766,399 | S | 9/2016 | Bullock et al. |
| 9,763,437 | B2 | 9/2017 | Schnaider et al. |
| 9,832,926 | B2 | 12/2017 | Jung et al. |
| 9,839,211 | B2 | 12/2017 | Depriest et al. |
| 9,884,330 | B2 | 2/2018 | Humpal et al. |
| 10,085,437 | B2 | 10/2018 | Mariani et al. |
| 10,178,863 | B2 | 1/2019 | Schnaider et al. |
| 10,189,031 | B2 | 1/2019 | Funseth et al. |
| 10,323,683 | B2 | 6/2019 | Tortorella et al. |
| 10,440,942 | B2 | 10/2019 | Barker et al. |
| 10,556,476 | B2 | 2/2020 | Dames et al. |
| 10,676,090 | B2 | 6/2020 | Kremmer et al. |
| 10,730,065 | B2 | 8/2020 | Funseth et al. |
| 10,773,271 | B2 | 9/2020 | Funseth et al. |
| 10,830,275 | B2 | 11/2020 | Tortorella et al. |
| 10,994,297 | B2 | 5/2021 | Funseth et al. |
| 11,076,588 | B2 | 8/2021 | Mariani et al. |
| 11,234,432 | B2 | 2/2022 | Bartlett et al. |
| 11,510,404 | B2 | 11/2022 | Redden et al. |
| 11,589,523 | B2 | 2/2023 | Alders et al. |
| 11,602,142 | B2 * | 3/2023 | Weidenbach ....... A01M 7/0089 |
| 11,627,700 | B2 | 4/2023 | Schnaider et al. |
| 11,659,827 | B2 | 5/2023 | Baxter et al. |
| 11,758,896 | B2 | 9/2023 | Sullivan |
| 2016/0081321 | A1 | 3/2016 | Schnaider et al. |
| 2020/0029548 | A1 | 1/2020 | Weidenbach et al. |
| 2020/0406281 | A1 | 12/2020 | Funseth et al. |
| 2021/0274770 | A1 | 9/2021 | Baxter et al. |
| 2021/0274773 | A1 | 9/2021 | Sporrer et al. |
| 2021/0289702 | A1 | 9/2021 | Jung et al. |
| 2022/0132826 | A1 | 5/2022 | Bartlett et al. |
| 2022/0143632 | A1 | 5/2022 | Bharatiya et al. |

OTHER PUBLICATIONS

"U.S. Appl. No. 16/510,831, Notice of Allowance mailed Dec. 28, 2022", 7 pgs.

"U.S. Appl. No. 16/510,831, Response filed Jun. 29, 2022 to Restriction Requirement mailed Apr. 29, 2022", 13 pgs.

"U.S. Appl. No. 16/510,831, Response filed Nov. 9, 2022 to Non Final Office Action mailed Aug. 9, 2022", 20 pgs.

"U.S. Appl. No. 16/510,831, Restriction Requirement mailed Apr. 29, 2022", 7 pgs.

"Canadian Application Serial No. 3,106,178, Examiner's Rule 86(2) Report mailed Oct. 18, 2022", 9 pgs.

"Canadian Application Serial No. 3,106,178, Office Action mailed Mar. 3, 2022", 4 pgs.

"Canadian Application Serial No. 3,106,178, Response filed Jul. 4, 2022 to Office Action mailed Mar. 3, 2022", 149 pgs.

"International Application Serial No. PCT/US2019/041731, International Preliminary Report on Patentability mailed Apr. 27, 2021", 8 pgs.

"International Application Serial No. PCT/US2019/041731, International Search Report mailed Oct. 25, 2019", 4 pgs.

"International Application Serial No. PCT/US2019/041731, Invitation to Pay Additional Fees mailed Aug. 30, 2019", 2 pgs.

"International Application Serial No. PCT/US2019/041731, Written Opinion mailed Oct. 25, 2019", 8 pgs.

U.S. Appl. No. 16/510,831, filed Jul. 12, 2019, Agricultural Implement Suspension System.

"Canadian Application Serial No. 3,106,178, Response filed Feb. 10, 2023 to Examiner's Rule 86(2), Report mailed Oct. 18, 2022, 16 pgs.", 16 pgs.

"U.S. Appl. No. 18/172,671, Preliminary Amendment filed May 11, 2023", 7pgs.

"Canadian Application Serial No. 3,106,178, Examiners Rule 86(2) Report mailed Mar. 14, 2024", 9 pgs.

"Canadian Application Serial No. 3,106,178, Response filed Jul. 15, 2024 to Examiners Rule 86(2) Report mailed Mar. 14, 2024", 42 pgs.

* cited by examiner

AGRICULTURAL IMPLEMENT SUSPENSION SYSTEM

CLAIM OF PRIORITY

This patent application is a continuation of U.S. patent application Ser. No. 16/510,831, filed Jul. 12, 2019, which claims the benefit of priority of Weidenbach et al. U.S. Provisional Patent Application Ser. No. 62/697,394 entitled "SEMI-ACTIVE AGRICULTURAL IMPLEMENT SUSPENSION AND METHOD FOR SAME," filed on Jul. 12, 2018, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries, Inc.; Sioux Falls, South Dakota. All Rights Reserved.

TECHNICAL HELD

This document pertains generally, but not by way of limitation, to agricultural implements and agricultural implement suspensions.

BACKGROUND

In some examples, an agricultural implement (e.g., a sprayer, harvester, planter, or the like) is coupled with a prime mover (e.g., a tractor, truck, machine, or the like). For example, a sprayer is optionally coupled with a tractor. The tractor is configured to move (e.g., drive, roll, or the like) along terrain (e.g., a road, path, field, row, or the like). In some examples, the terrain is uneven (e.g., bumpy, rough, sloped, heaved, furrowed, or the like). Movement of the prime mover along the terrain optionally causes the agricultural implement to interact with (e.g., collide, touch, hit, contact, rests upon, or the like) the terrain.

SUMMARY

The present inventors have recognized, among other things, that a problem to be solved can include avoiding (e.g., limiting, reducing, inhibiting, stopping, preventing, or the like) interaction between an agricultural implement and terrain proximate to the agricultural implement. In some examples, the agricultural implement interacts with the terrain when a prime mover transports the agricultural implement over uneven terrain. In an example, the transport (e.g., by the prime mover or a trailer) of the agricultural implement over uneven terrain causes movement (e.g., bouncing, swinging, swaying, flailing, or the like) of the agricultural implement. In one example, movement of the agricultural implement causes interaction of the agricultural implement with the terrain. For example, the prime mover traverses over a bump in a farm field. The traversing over the bump moves the chassis of the prime mover (or a chassis of a trailer). The agricultural implement is optionally coupled to the chassis, and the agricultural implement moves with the prime mover. For instance, a sprayer boom of the agricultural implement sways in response to a trailer traversing over the bump.

The present subject matter can help provide a solution to this problem, such as by providing a semi-active suspension system. The semi-active suspension system includes a suspension element having a damping coefficient range. In an example, the suspension element includes an implement end configured for coupling with the agricultural implement. Additionally, the suspension element includes a chassis end configured for coupling with a prime mover chassis of a prime mover (e.g., a tractor, a combine, truck, or the like) or a trailer chassis of a trailer (e.g., a trailer towed behind a tractor).

The semi-active suspension system includes a suspension control circuit in communication with the suspension element (e.g., a wireless signal, voltage, current, power, data signal or the like that initiates a change in damping coefficient). The suspension control circuit optionally includes a kinematic assessment circuit in communication with one or more sensors. The kinematic assessment circuit is configured to measure or determine kinematic characteristics (e.g., position, velocity, acceleration, jerk, angular position, angular velocity, angular acceleration, angular jerk, or the like) of one or more of the agricultural implement and the chassis.

In some examples, the suspension control circuit includes a damping control circuit, and the damping control circuit generates a specified damping characteristic based on the measured or determined kinematic characteristics of one or more of the agricultural implement and the chassis. The damping control circuit optionally, directs the suspension element to operate within the damping coefficient range (e.g., at one or more damping coefficients within the range) based on the specified damping characteristic and the related kinematic characteristics.

The semi-active suspension system helps the agricultural implement avoid interaction with the terrain. For example, the suspension control circuit operates the suspension element to damp movement of the agricultural implement in a graduated controlled manner. In an example, the suspension control circuit graduates the specified damping characteristic in proportion to a determined kinematic imbalance (e.g., an imbalance of forces, moments, or the like) of one or more of the agricultural implement and the chassis. The modulation of the specified damping characteristic initiates a change in a damping coefficient of the suspension element. The change in the damping coefficient of the suspension element modulates damping relative to the movement of the agricultural implement.

For example, the specified damping characteristic is graduated to increase damping of the agricultural implement, for instance when the agricultural implement rotates (e.g., a sprayer boom swaying down toward the ground) while the chassis does not rotate. The increase in damping helps avoid interaction between the agricultural implement and the terrain, for instance by damping the rotation of agricultural implement. Increasing the damping of the agricultural implement reduces (e.g., restricts, inhibits, prevents, slows, stops, or the like) relative motion between the agricultural implement and the chassis. In another example, the specified damping characteristic is graduated to decrease damping of the agricultural implement, for example when the chassis rotates (e.g., rolls, pitches, or the like) as the chassis traverses over uneven terrain. Reducing the damping of the agricultural implement facilitates relative motion between the agricultural implement and the chassis. Accordingly, the semi-active suspension system helps the agricultural implement continue in its current orientation (e.g., based on inertia and prior control effort) and avoid interaction with the terrain, for instance by isolating motion of the chassis (e.g., rolling motion of the chassis) from the agricultural implement.

The present inventors have recognized, among other things, that a problem to be solved can include interaction of the agricultural implement with an obstacle (e.g., a hill, berm, furrow, tree, bump, divot, hole, or the like) in the terrain. For example, the prime mover transports the agricultural implement and locates the agricultural implement proximate to a hill. In some examples, the transport of the agricultural implement causes the agricultural implement to interact with the obstacle, Interaction of the agricultural implement with the terrain reduces performance of the agricultural implement, for instance by unevenly applying a fertilizer to a crop field. In some examples, interaction of the agricultural implement with the terrain damages the agricultural implement, for instance by bending a sprayer boom.

The present subject matter can help provide a solution to this problem, such as by moving the agricultural implement to avoid interaction of the agricultural implement with the terrain. In an example, the agricultural implement is moveably coupled with the chassis, and the agricultural implement is optionally moved (e.g., raised, lowered, rotated, or the like) to avoid interaction between the agricultural implement and the terrain. For example, an actuator is optionally coupled between the implement support frame (or the chassis) and the sprayer boom. Operation of the actuator (e.g., by a user manipulating a controller) causes movement of the sprayer boom relative to the implement support frame (or the chassis).

In some examples, movement of sprayer boom relative to the implement support frame (or the chassis) causes a kinematic imbalance. In an example, the kinematic imbalance affects the performance of the agricultural implement, for instance by altering the orientation of a component of the agricultural implement relative to another component of the agricultural implement. The present inventors have recognized, among other things, that a problem to be solved can include reducing the occurrence of kinematic imbalances. For example, the semi-active suspension system damps movement of at least the implement support frame during movement of the sprayer boom relative to the implement support frame. Damping the movement of at least the implement support frame reduces movement of other components connected to the implement support frame, for instance an additional sprayer boom that is coupled to the implement support frame.

The present inventors have recognized, among other things, that a problem to be solved can include maintaining a gap between the agricultural implement and the terrain. The present subject matter can help provide a solution to this problem, such as by configuring the semi-active suspension system to maintain a gap between the agricultural implement and the terrain. For example, the system maintains the gap between the agricultural implement and the terrain within a gap range. In an example, the system determines the distance between the agricultural implement and the terrain, for instance with a sensor. The gap between the agricultural implement and the terrain may vary depending upon the characteristics of the terrain (e.g., if the terrain is bumpy). The system optionally moves the agricultural implement to maintain the agricultural implement within the gap range, for instance to maintain the agricultural implement at a specified distance (e.g., two feet, a meter, or the like) from the terrain as the agricultural implement is transported along the terrain.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
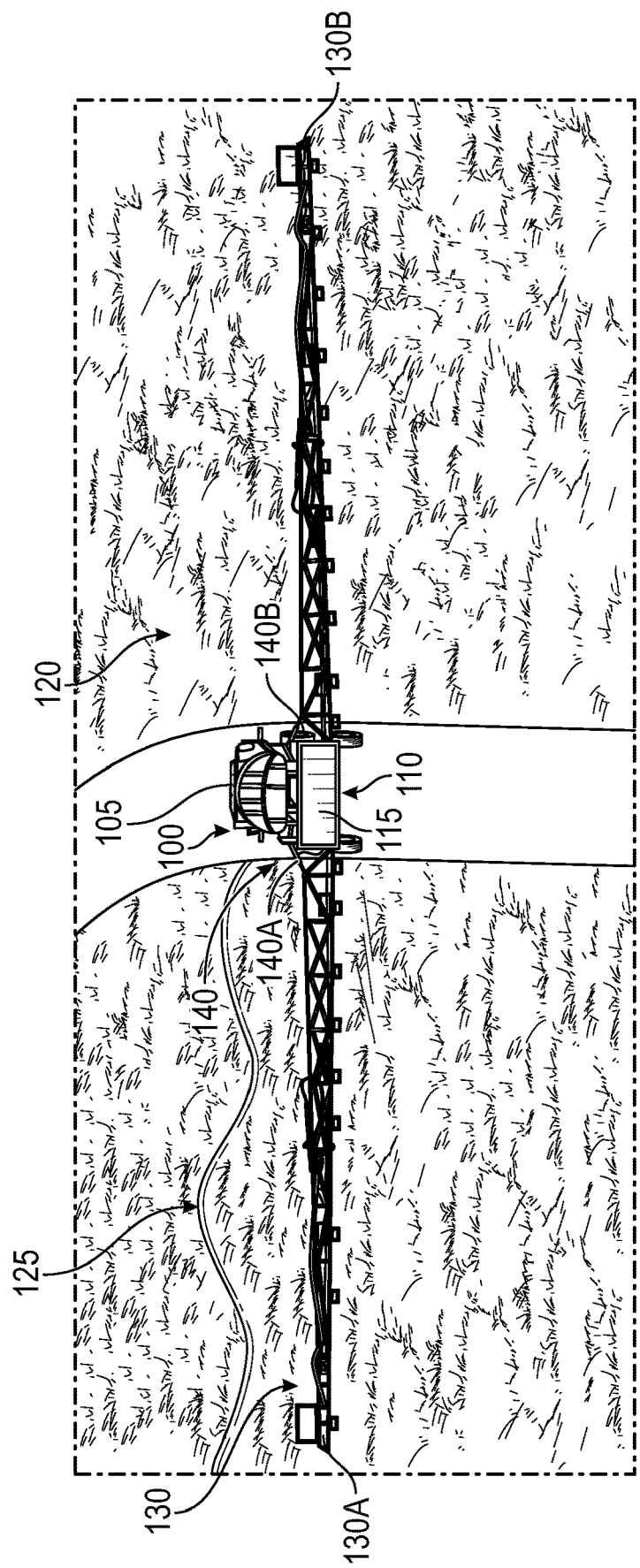
FIG. 1A is a perspective view of a chassis for a prime mover and an agricultural implement with a first kinematic configuration.
Figure 1B:
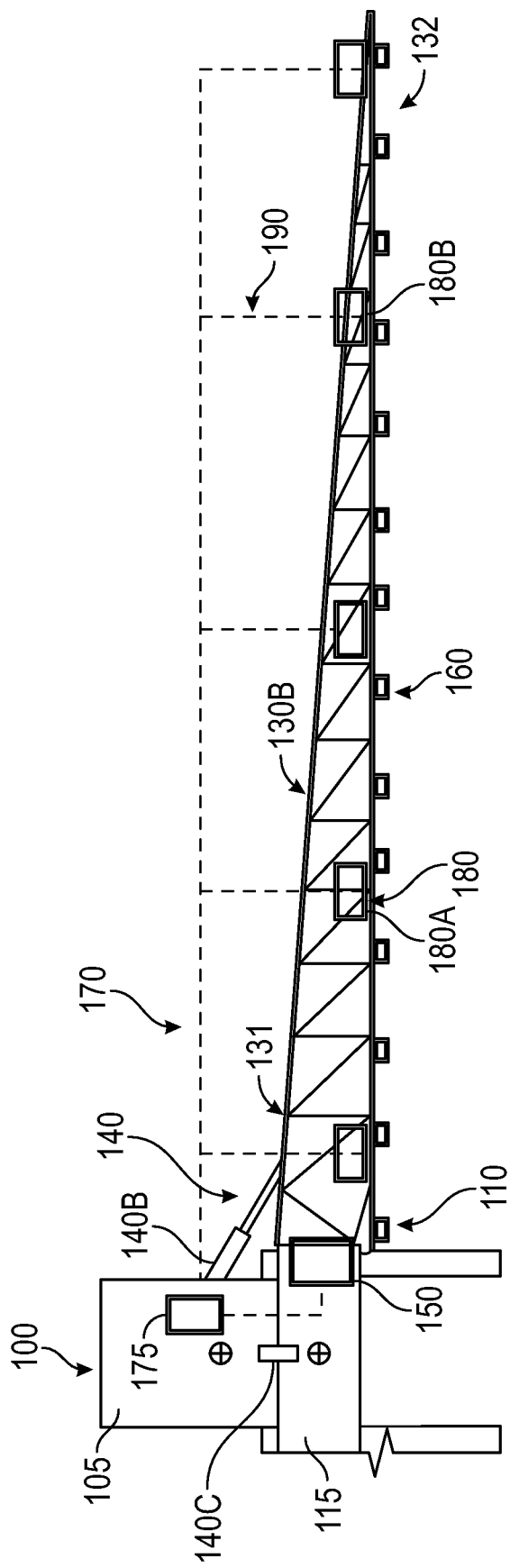
FIG. 1B is a schematic view of the chassis, the prime mover, and the agricultural implement of FIG. 1.

FIGS. 1A and 1B are respectively a perspective view and a schematic view of a chassis 100 for a prime mover 105 (e.g., a vehicle including a prime mover, tow behind vehicle or the like) and an agricultural implement 110 with a first kinematic configuration, such as a collected series of associated implement positions (of the implement frame, booms or the like). The prime mover 105 is configured to traverse (e.g., move, drive, roll, or the like) across terrain 120 (e.g., ground, earth, a farm field, or the like). The prime mover 100 includes, but is not limited to, a tractor, truck, machine, or the like. In some examples, the chassis 100 is included in a trailer, and the trailer is transportable (e.g., pullable, towable, or the like). For example, the prime mover 105 is optionally hitched to the trailer and the prime mover 105 transports the trailer across the terrain 120.

The agricultural implement 110 includes, but is not limited to, a sprayer, a harvester head, sprayer boom, sprayer boom and implement rack assembly planter row or rows, baler, swather or the like. For example, the agricultural implement 110 optionally includes one or more booms 130 (e.g., a beam, truss, or the like), for instance a first boom 130A and a second boom 130B. The booms 130 extend from the chassis 100, and support agricultural equipment (e.g., a sprayer, harvester, planter, or the like).

In an example, the boom 130A is coupled with an implement support frame 115. The implement support frame 115 provides an interface for attaching the agricultural implement 110 to the chassis 100. The implement support frame supports the boom 130 while coupled to the chassis 100. In some examples, the boom 130 is moveably coupled to (e.g., rotatable with respect to, articulatable with respect to, or the like) the implement support frame 115. The implement support frame 115 is configured to couple with the chassis 100. For example, the implement support frame 115 includes coupling features that engage with corresponding coupling features of the chassis 100 to facilitate coupling of the implement support frame 115 to the chassis 100.

Referring to FIGS. 1A and 1B, one or more suspension elements 140 are coupled to the chassis 100 and the agricultural implement 110. In an example, the suspension elements 140 include, but are not limited to, a first suspension element 140A, a second suspension element 1408, and a third suspension element 140C, In one example, the suspension elements 140A, 140B are coupled between the chassis 100 and the booms 130. Optionally, the suspension elements 140A, 140B are used as actuators to move the booms 130 in addition to providing suspension for the booms 130, for instance with a hydraulic accumulator as described herein. In another example, the suspension element 140C is coupled between the chassis 100 and the implement support frame 115.

In some examples, the suspension elements 140 damp (e.g., reduce, decrease, slow, lessen, cushion, or the like) movement of the agricultural implement 110. For example, the suspension elements 140 damp relative movement between the chassis 100 and the implement support frame 115. In another example, the suspension elements 140 damp relative movement between the chassis 100 and the booms 130. In yet another example, the suspension elements 140 damp relative movement between the implement support frame 115 and the booms 130. The suspension elements 140 each have a damping coefficient range, for example between a floor (e.g., low) damping coefficient and a ceiling (e.g., high) damping coefficient. The suspension elements 140 operate within the damping coefficient range, and a change in a damping coefficient proportionally changes the damping (e.g., mechanical response) of the suspension elements 140. In one example, at least one of the suspension elements 140, such as 140C coupled between the chassis and the implement support frame 115 includes a magnetorheological material. A change in the damping characteristic (e.g., a signal such as voltage, damping coefficient value or the like based in part on the kinematic characteristics described herein) changes a magnetic field applied to the suspension element 140C, and accordingly the damping (e.g., mechanical response) of the suspension element 140B changes in proportion to the change in the damping characteristic.

In another example, one or more of the suspension elements, such as 140A, B, include a hydraulic cylinder 141 and a modulating accumulator 142. In this example, a valve 143 of the modulating accumulator 142 is moved between open and closed positions (e.g., within a range of positions between open and closed) to accordingly open and close the modulating accumulator 142. Corresponding filling and evacuation of the modulating accumulator 142 (slowing or more rapidly with changes in valve position) thereby controls damping with the hydraulic cylinder 141 used as the actuator 150 for one or more of the booms 130. For instance, the damping of the suspension elements 140A, B (in this example also the actuators) changes in proportion to a change in the valve opening dimension.

Optionally, one or more actuators 150 move the booms 130. For example, the actuators 150 move the boom 130B relative to one or more of the implement support frame 150 and the chassis 100. The actuators 150 move the booms 130 to change the position (e.g., height, angle, pitch, radius, or the like) of the booms. In an example, the booms 130 are moved to change the position of sprayers 160 that dispense an agricultural fluid (e.g., fertilizer, or the like) onto the terrain 120.

In some examples, a semi-active suspension system 170 includes the suspension elements 140 and a suspension control circuit 175. The suspension control circuit 175 is in communication with (e.g., electrically, hydraulically, wirelessly, or the like) the suspension elements 140. The suspension control circuit 175 directs the suspension element to operate according to a determined damping characteristic (e.g., determined based on kinematic characteristics, described herein). Optionally, the damping characteristic corresponds to a damping coefficient within the damping coefficient range of the respective suspension element 140. Accordingly, the suspension control circuit 175 facilitates a change in the of the suspension elements 140. As described in greater detail herein, in some examples, the damping provided by the suspension elements 140 is changed based on a specified damping characteristic. The specified damping characteristic is based on one or more of measured or determined kinematic characteristics of one or more of the chassis 100 and the agricultural implement 110.

Referring to FIGS. 1A and 1B, one or more proximity sensors 180 are optionally coupled to at least one of the chassis 100, the implement support frame 115, and the booms 130. In an example, the proximity sensors 180 are in communication with the suspension control circuit 175 and the proximity sensors 180 measure a distance between the sensors 180 and an object (e.g., the terrain 120). For instance, the sensors 180 are coupled with the boom 130B and measure the distance between the boom 130B and the terrain 120. In another example, the sensors 180 facilitate measuring the distance between the sprayers 160 and the terrain 120.

As shown in FIG. 1A, the chassis 100, the prime mover 105, and the agricultural implement are in a first kinematic configuration. For example, the chassis 100 is not rotating (e.g., rolling, tipping, pitching, or the like) in FIG. 1A because the prime mover 105 is traversing along consistent (e.g., smooth, even, or the like) terrain 120. Additionally, the implement support frame 115 is not rotating. Further, the booms 130 are not interacting with the terrain 120.

In an example, the terrain 120 is consistent (e.g., smooth, planar, or the like). In another example, the terrain 120 is uneven (e.g., bumpy, hilly, or the like). For example, the terrain 120 optionally includes an obstacle 125 (e.g., a hill, a mound, a tree, or the like). In some examples, the agricultural implement 110 interacts with the obstacle 125 if the agricultural implement is transported proximate to the obstacle 125. In an example, the prime mover traversing over the terrain 120 encounters the obstacle 125. The agricultural implement will interact with the obstacle unless the interaction is avoided. In an example, a control effort is applied to the boom 130A to move the boom 130A out of the way of the obstacle 1255. The control effort applied to the boom 130A creates a kinematic imbalance incident upon one or more of the implement support frame 115 and the chassis 100.

Figure 2:
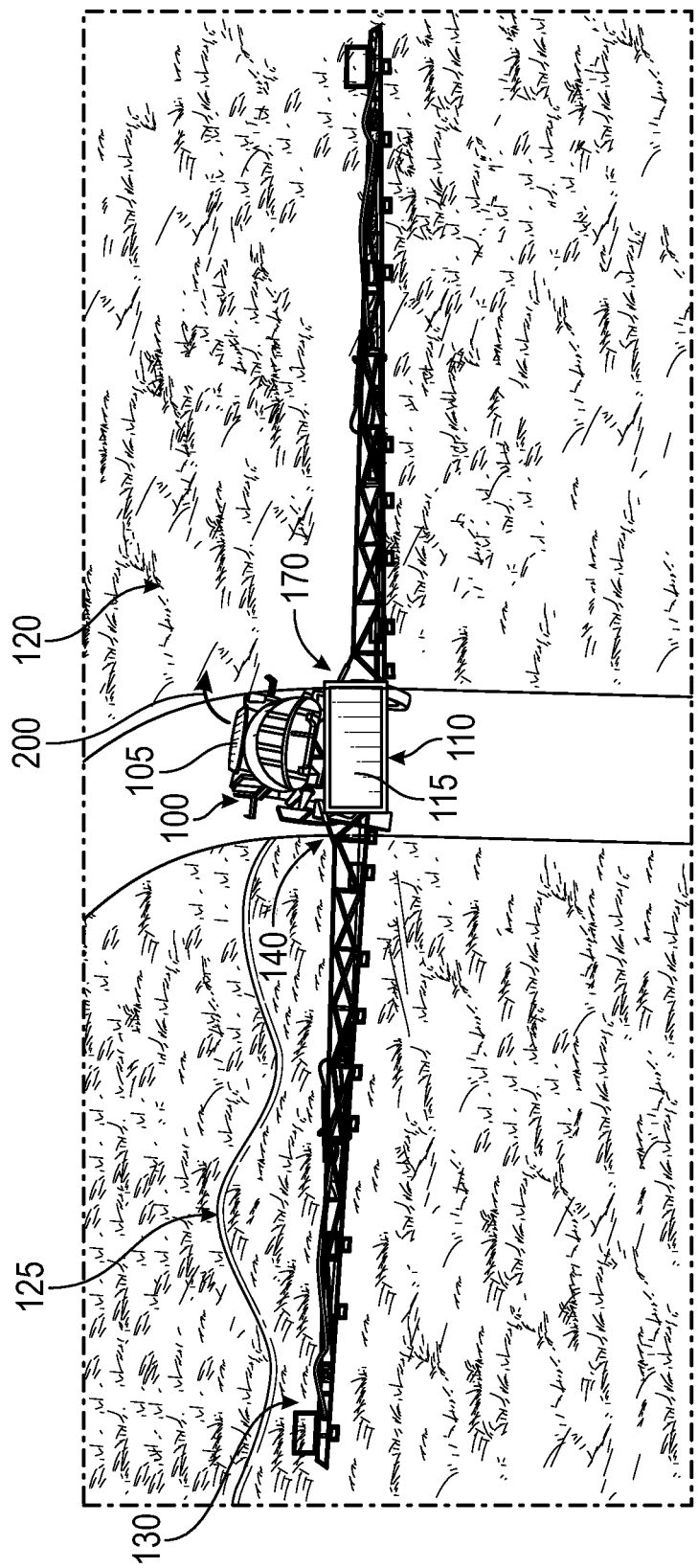
FIG. 2 is a perspective view of the chassis, the prime mover, and the agricultural implement of FIG. 1A with a second kinematic configuration.

FIG. 2 is a perspective view of the chassis 100, the prime mover 105, and the agricultural implement 110 of FIG. 1A in a second kinematic configuration. As shown in FIG. 2, the chassis 100 is rotated, for example in the direction of the arrow 200. As described herein, the implement support frame 115 is optionally coupled with the chassis 100. In some examples, the implement support frame 110 moves (e.g., has one or more degrees of freedom) with respect to the chassis 100. For example, the implement support frame 115 rotates (e.g., clockwise or counter-clockwise) with respect to the chassis 100. In another example, the chassis 100 rotates with respect to the implement support frame 115. For instance, the chassis 100 rotates when traversing uneven terrain 120. In this example, because the implement support frame 110 moves relative to the chassis 100 (e.g., continues in its previous posture from FIG. 1B due to inertia and previous control effort), the implement support frame does not rotate with chassis 100.

In one example, the suspension control system 170 directs the suspension elements 140 to operate within the damping coefficient range. For example, the suspension control system 170 directs a decrease in the damping coefficient of the suspension elements 140 when the chassis 100 rotates (e.g., in the direction of the arrow 200) and when the agricultural implement 110 does not rotate (or rotates in a direction opposite to the arrow 200). Accordingly, in some examples, the relative motion between the chassis 100 and the agricultural implement 140 absorbs the movement of the chassis 100 and reduces the movement of the agricultural implement 110 as a result of the chassis 100 traversing uneven terrain thereby, minimizing 'flying' up of one or more of the booms 130A, B relative to a specified application distance or height or 'crashing' down of one or more of the booms 130A, B with the ground.

Figure 3:
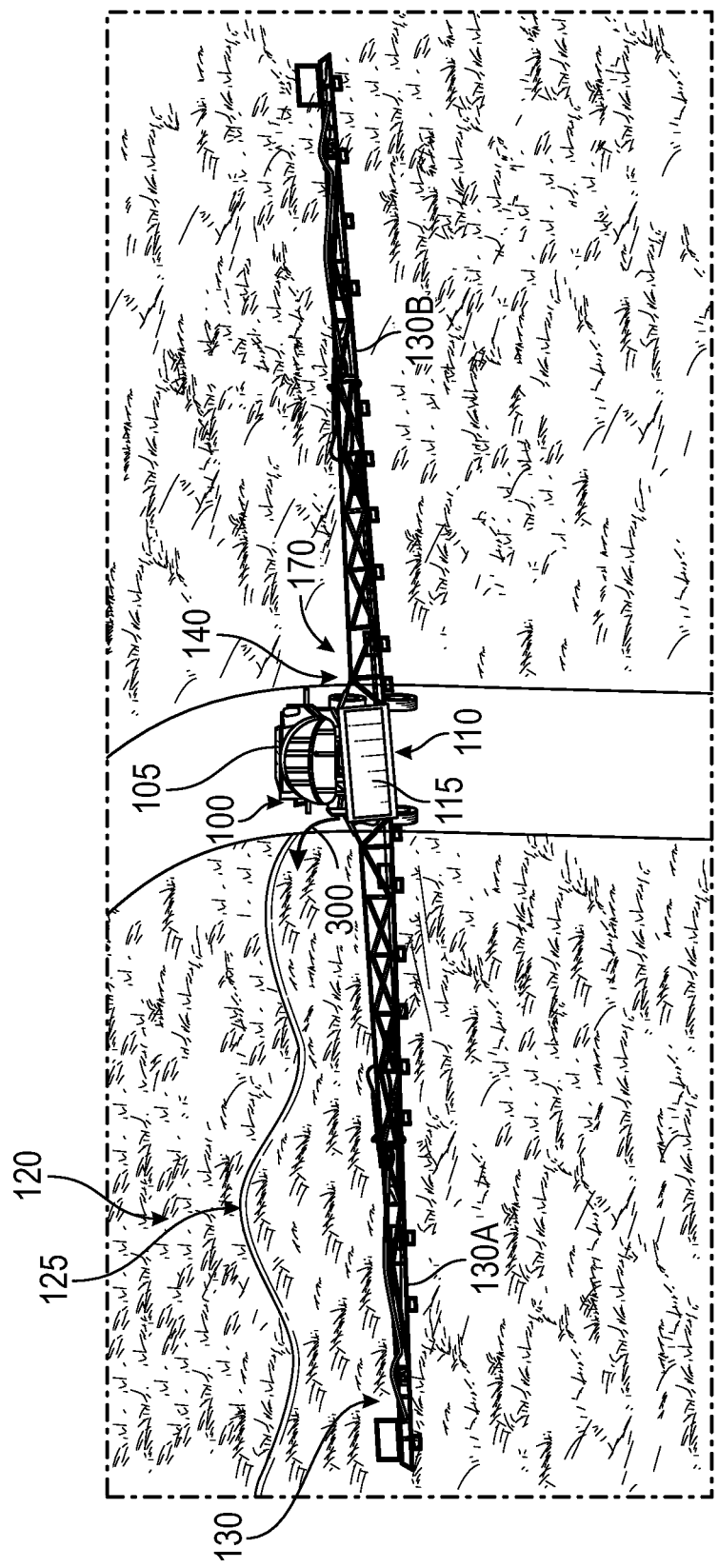
FIG. 3 is a perspective view of the chassis, the prime mover, and the agricultural implement of FIG. 1A with a third kinematic configuration.

FIG. 3 is a perspective view of the chassis 100, the prime mover 105, and the agricultural implement 110 of FIG. 1A with a third kinematic configuration. As shown in FIG. 3, the agricultural implement 110 (e.g., the implement support frame 115) is rotated, for instance in the direction of arrow 300. In this example, because the booms 130 are coupled with the implement support frame 115, the booms 130 move in proportion to movement of the implement support frame 115. Accordingly, in some examples, rotation of the implement support frame 115 causes a proportional (e.g., corresponding) rotation of the booms 130.

In an example, the semi-active suspension system 170 directs the suspension elements to operate within the damping coefficient range. For example, the suspension control system 170 provides a damping characteristic (as described herein, based on one or more measured or determined kinematic characteristics) that increases the damping of the suspension elements 140 (e.g., suspension element 140C in FIG. 1B) when the implement support frame 115 rotates (e.g., in the direction of the arrow 300) and when the chassis 100 does not rotate (or rotates in a direction of the arrow 200).

In some examples, the booms 130 are moveable relative to the implement support frame 115. Movement of the booms causes a kinematic imbalance within the semi-active suspension system 170. For example, the first boom 130A is optionally moved (e.g., rotated in the direction opposite to the arrow 300) to avoid interacting with the terrain 120. In this example, because the boom is moveably coupled to the implement support frame 115, the movement of the booms 130 applies a kinematic load (e.g., a force, a moment, or the like) to the implement support frame 115. When the kinematic load applied to the implement support frame 115 is uneven (e.g., if the boom 130A is moved to a different magnitude or relative to the boom 130B) a kinematic imbalance is incident upon one or more of the chassis 100 and the implement support frame 115. In some examples, the kinematic imbalance causes movement of one or more of the chassis 100, the implement support frame 115, and the booms 130.

In an example, the boom 130B is rotated (e.g., in the direction of arrow 300) to compensate for the kinematic load incident upon the implement support frame 115 due to rotation of the boom 130A. For instance, the boom 130B counterrotates with respect to the boom 130A to compensate for the kinematic load incident upon the implement support frame 115. In another example, the semi-active suspension system 170 compensates for the kinematic imbalance incident upon one or more of the chassis 100 and the frame 115 by directing the suspension elements 140 to operate according to a damping characteristic determined based on these measured and determined kinematic characteristics. In some examples, the damping characteristic corresponds to a damping coefficient of the suspension element 140, such as a hydraulic suspension cylinder that minimizes the effect of the kinematic imbalance, such as counter-rotation of an opposed boom.

Figure 4:
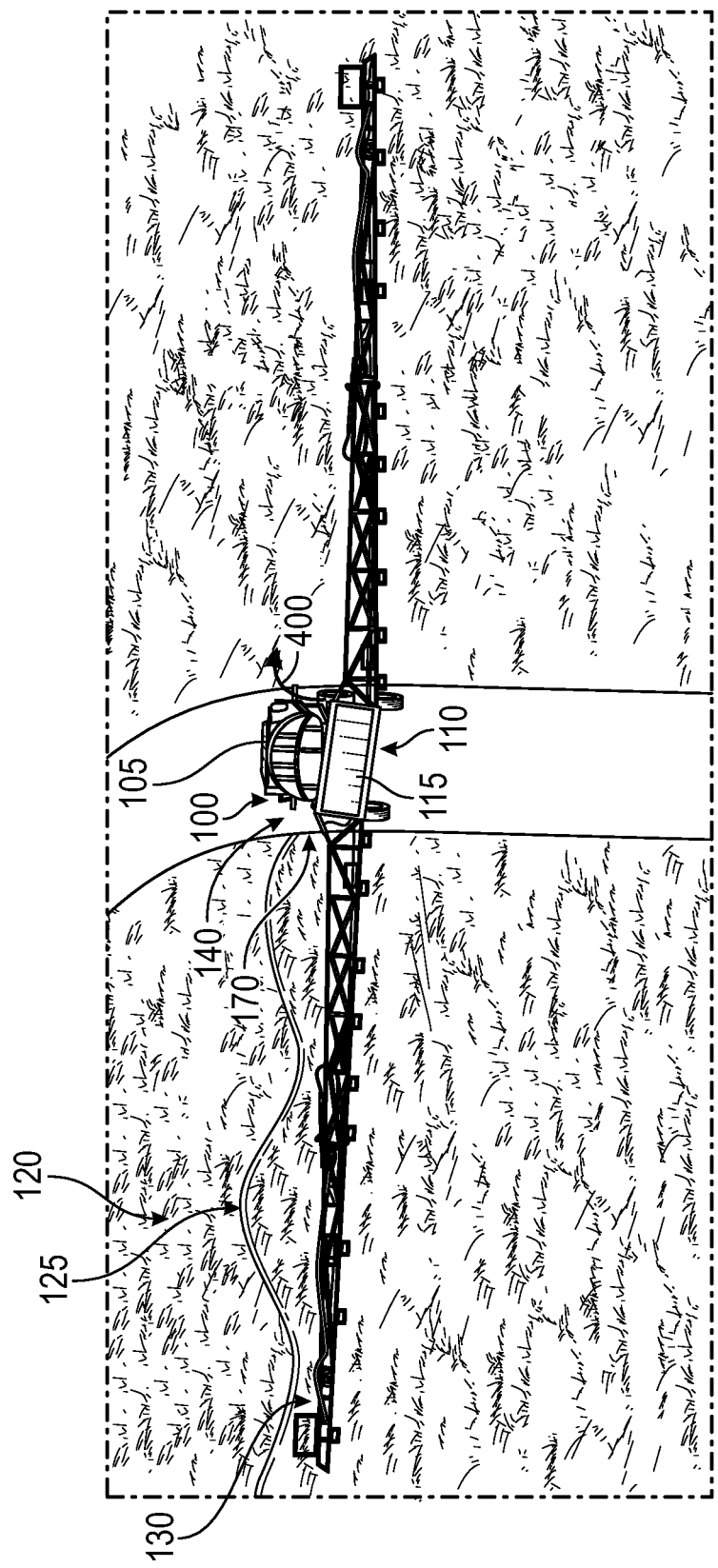
FIG. 4 is a perspective view of the chassis, the prime mover, and the agricultural implement of FIG. 1A with a fourth kinematic configuration.

FIG. 4 is a perspective view of the chassis 100, the prime mover 105, and the agricultural implement 110 of FIG. 1A with a fourth kinematic configuration. As shown in FIG. 1, the agricultural implement 110 is rotated with respect to the chassis 100, for instance in the direction of arrow 400 due to a kinematic imbalance. The semi-active suspension system 170 directs the suspension elements 140 to operate at a damping coefficient that reduces the kinematic imbalance. In some examples, the booms 130 are rotated to reduce the kinematic imbalance. In another example, the booms 130 are rotated to maintain the position of the booms with respect to the terrain 120, For example, the booms 130 are rotated to maintain the boom 130A within a gap range, for instance at a first gap (e.g., distance) from the terrain.

Figure 5:
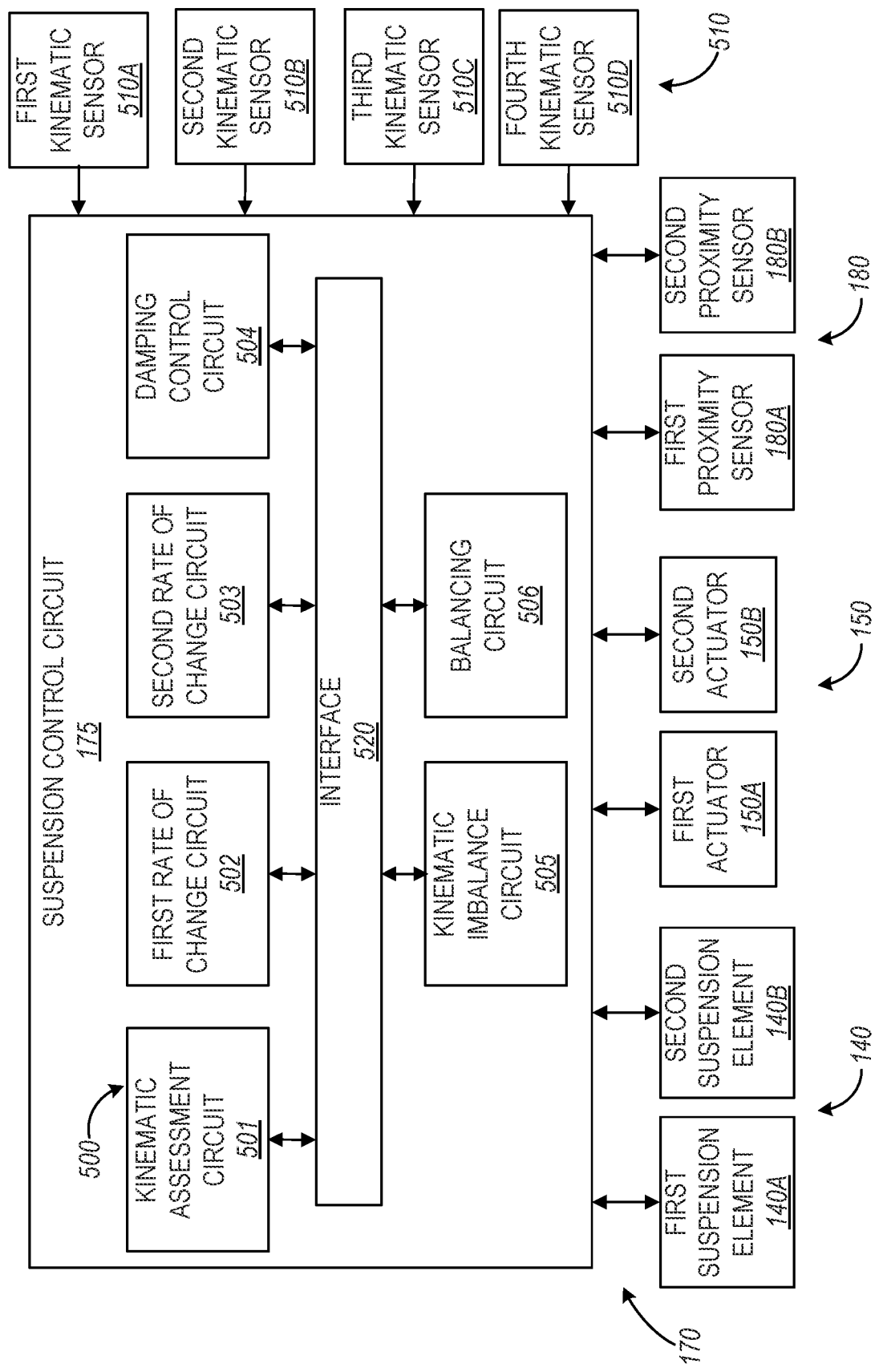
FIG. 5 is a schematic view of a semi-active suspension system.

FIG. 5 is a schematic view of the semi-active suspension system 170. As described herein, the semi-active suspension system 170 includes the suspension control circuit 175. The suspension control circuit 175 controls one or more functions or components of the semi-active suspension system 170. For instance, the suspension control circuit 175 directs the suspension elements 140 operate within the damping coefficient range based on a specified damping characteristic.

In an example, the suspension control circuit 175 includes one or more circuits 500, for example a kinematic assessment circuit 501. The kinematic assessment circuit 501 is in communication with one or more kinematic sensors 510, and the kinematic assessment circuit 501 is configured to measure or determine kinematic characteristics of one or more of the agricultural implement 110 and the chassis 100. For instance, the sensors 510 include one or more of a position sensor, a velocity sensor, an acceleration sensor, a jerk sensor, a force sensor, and a torque sensor.

The sensors 510 measure kinematic characteristics (e.g., position, altitude, attitude, velocity, acceleration, jerk, angular position, angular velocity, angular acceleration, angular jerk, or the like) of one or more of the agricultural implement 110 and the chassis 100. For example, a first kinematic sensor 510A is coupled with the chassis 100. The first sensor 510A measures one or more kinematic characteristics (e.g., angular acceleration) of the chassis 100, for instance to determine whether the chassis 100 is rotating. In another example, a second kinematic sensor 510B is coupled to the implement support frame 115, and the sensor 510B measures one or more kinematic characteristics (e.g., angular velocity) of the implement support frame 115. A third sensor 510C is optionally coupled to the first boom 130A, and the third sensor 510C measures one or more kinematic characteristics of the first boom 130A. A fourth sensor 510D is optionally coupled to the second boom 130B, and the fourth sensor 510D measures one or more kinematic characteristics (e.g., velocity) of the second boom 130B.

In some examples, the kinematic assessment circuit 501 determines the kinematic characteristics of one or more of the agricultural implement 115 and the chassis 100. For example, the first sensor 110A measures velocity of the boom 130B (shown in FIG. 1). The kinematic assessment circuit 501 optionally determines kinematic characteristics by converting (e.g., deriving, integrating, transforming, mathematically manipulating, or the like) the measurement of the velocity of the boom 130B to determine one or more kinematic characteristics, for instance the position of the boom 130B, the acceleration of the boom 130B, and the jerk of the boom 130B.

In another example, the kinematic assessment circuit 501 determines the kinematic characteristics of the chassis 100 relative to the agricultural implement 110. For example, the kinematic assessment circuit 501 combines a first set of kinematic characteristics provided by the first sensor 110A (that is coupled to the chassis 100) with a second set of kinematic characteristics provided by the second sensor 110B (that is coupled to the implement support frame 115). The kinematic assessment circuit 501 optionally determines the kinematic characteristics of the agricultural implement 110 (e.g., the implement support frame 115) by isolating the kinematic characteristics of the chassis 100 from the measured kinematic characteristics of the agricultural implement. For example, the kinematic assessment circuit 501 determines the one or more of the relative position, velocity, acceleration, displacement or the like of the agricultural implement 110 relative to the chassis 100. Accordingly, the kinematic assessment circuit 501 determines the kinematic characteristics of the agricultural implement 110 as the chassis 100 traverses the terrain 120 (shown in FIG. 1A).

In an example, the suspension control circuit 175 includes one or more of a first rate of change circuit 502 and a second rate of change circuit 503. The rate of change circuits 502, 503 determine the rate of change of one or more measured kinematic characteristics associated with one or more of the chassis 100 and the agricultural implement 110. In another example, the second sensor 130B measures the position of the boom 130B. The one or more of the rate of change circuits 502, 503 determine the rate of change of the measured position of the boom 130B. For instance, the rate of change circuits 502, 503 taking one or more (e.g., two) derivatives of the position of the boom 130B. The rate of change circuits 502, 503 are in communication with the kinematic assessment circuit 501, and the kinematic assessment circuit 501 determines the acceleration of the boom 130B based on the determined rate of change of the boom 130B.

The suspension control circuit 175 optionally includes a damping control circuit 504. The circuits 500 communicate with the interface 520 (e.g., a bus, input-output board, or the like) and the interface facilitates the communication between the circuits 500. For example, the damping control circuit 504 communicates with the kinematic assessment circuit 501 via the interface 520. In another example, the circuit 501 communicates directly (e.g., with a wiring trace) with the circuit 504.

The damping control circuit 504 generates a specified damping characteristic (e.g., voltage, current, magnetic field, value, integer, binary state, or the like) based on the measured or determined kinematic characteristics. In an example, the damping control circuit 504 directs the suspension elements 140 to operate within the damping coefficient range (e.g., at a specified damping coefficient). In some examples, the damping control circuit 504 generates the specified damping characteristic between a floor damping characteristic and a ceiling damping characteristic. The generated specified damping characteristic of the damping control circuit 504 optionally corresponds to a damping coefficient between a floor damping coefficient and a ceiling damping coefficient within the range of damping coefficients for the suspension elements 140. Accordingly, the damping control circuit 504 directs the operation of the suspension elements 140 across a range of damping characteristics that correspondingly modulate the mechanical response of the implement (e.g., the implement support rack, booms or the like) based on the measured and determined kinematic characteristics. The varying damping characteristics implemented in the suspension element between a floor and ceiling for the suspension element correspond, in one example, to the range of damping coefficients that provide specified damping configurations for the suspension elements 140 that address force or load imbalances (examples of kinematic characteristics) caused by terrain variations, positioning of the implement (e.g., movement of the booms to achieve a specified target height) or the like.

The suspension control circuit 175 graduates the specified damping characteristic to change the damping configuration of the suspension elements 140. For example, the plurality of damping configurations each include a different damping coefficient. The damping control circuit graduates the specified damping characteristic based on the measured or determined kinematic characteristics provided by the kinematic assessment circuit 501. The damping control circuit 504 selects a damping configuration and associated damping coefficient from the plurality of damping configurations according to the one or more kinematic characteristics of one or more of the agricultural implement 110 and the chassis 100. Accordingly, a change in the kinematic characteristics of one or more of the chassis 100 and the agricultural implement 110 causes a graduation of the specified damping characteristic to provide a damping configuration based on the change in the measured or determined kinematic characteristics. In an example, the graduation of the specified damping characteristic changes a magnetic field applied to a magnetorheological material included in the suspension elements 140. The change in magnetic field correspondingly changes the damping of the suspension elements 140.

In some examples, the suspension control circuit 175 includes a kinematic imbalance circuit 505, and the kinematic imbalance circuit 505 determines a kinematic imbalance of the forces incident on one or more of the agricultural implement 110 and the chassis 100 according to the measured or determined kinematic characteristics. For example, movement of the boom 130A generates a force upon the implement support frame 115. The kinematic imbalance circuit 505 is in communication with the kinematic assessment circuit 501 and the sensors 510 to determine the kinematic imbalance.

In an example, the kinematic imbalance module 505 combines the measured or determined kinematic characteristics to determine the kinematic imbalance. For example, the kinematic imbalance module 505 combines a first set of kinematic characteristics provided by the first sensor 110A (that is coupled to the chassis 100) with a second set of kinematic characteristics provided by the second sensor 110B (that is coupled to the implement support frame 115). In another example, the kinematic imbalance circuit 505 determines the kinematic imbalance incident upon one or more of the chassis 100 and the agricultural implement by obtaining the rates of change of kinematic characteristics provided by the rate of change circuits 502, 503.

A balancing circuit 506 is optionally included in the suspension control circuit. The balancing circuit 506 balances forces incident upon one or more of the chassis 100 and the agricultural implement 110 based on the measured or determined kinematic characteristics. For example, if chassis 100 moves to the left two degrees, the support frame 110 is moved two degrees to the right to accommodate the movement of the chassis. In an example, the balancing circuit 506 graduates the specified damping characteristics of the one or more suspension elements 140, for instance by cooperating with the damping control circuit 501 to generate the specified damping characteristic. The balancing circuit 506 optionally graduates the specified damping characteristics to balance forces incident upon one or more of the agricultural implement 110 (e.g., the implement support frame 115) and the chassis 100.

In an example, the balancing circuit 506 graduates the specified damping characteristics to reduce the kinematic imbalance determined by the kinematic imbalance module 505. For example, the specified damping characteristic is graduated in proportion to the determined kinematic imbalance. In an example, the specified damping characteristic is increased (e.g., to increase damping of the implement support frame 115) in proportion to an increase in the determined kinetic imbalance (e.g., a kinetic imbalance of the support frame 115). For example, a voltage of a signal transmitted to the suspension element 140 is increased to operate the suspension element 140 at a damping coefficient that corresponds to the specified damping coefficient. In another example, the specified damping characteristic is decreased (e.g., to decrease damping of the boom 130A) in proportion to a decrease in the determined kinematic imbalance. In another example, the balancing circuit 506 graduates (e.g., decreases) the specified damping characteristic to inhibit movement of the implement support frame 115 relative to the chassis 100 (e.g., when the chassis 100 rotates and the implement support frame 115 does not roll with the chassis 100).

The balancing circuit 506 balances forces incident upon the agricultural implement 110. For example, the booms 130A, 130B are moveably coupled to the implement support frame 115. The suspension control circuit 175 is in communication with the actuators 150. In an example, the suspension control circuit 175 operates the first actuator 150A to move the boom 130A. The suspension control circuit 175 operates the second actuator 150B to move the boom 130B.

In an example, movement of the booms 130 by the actuators 150 produces a kinematic imbalance upon the implement support frame 115. The suspension control circuit 175 optionally balances the kinematic imbalance, for instance by graduating a first specified damping characteristic to change the damping coefficient of the first suspension element 150A. Optionally, the suspension control circuit (e.g., the balancing circuit 506) graduates a second specified damping characteristic to graduate the damping coefficient of the second suspension element 150B. In an example, the first specified damping characteristic is graduated to increase the damping coefficient of the suspension element 140A. The force imbalance caused by actuator 150 moving the boom 130A is balanced by the increase in the damping coefficient of the suspension element 140A. In some examples, the specified damping characteristics are graduated so that the first specified damping characteristic is different than the second specified damping characteristic (e.g., the first suspension element has a low damping coefficient and the second suspension element has a high damping coefficient).

In some examples, the suspension control circuit 175 compares the kinematic imbalance determined by the circuit 505 to an imbalance threshold. The suspension control circuit 175 optionally graduates the specified damping characteristics if the kinematic imbalance exceeds the imbalance threshold. For example, the chassis 100 is included in the prime mover 105 (shown in FIG. 1), and the prime mover traverses over the terrain 120. The terrain 120 has uneven (e.g., bumpy) portions and consistent (e.g., smooth) portions. The traversing of the prime mover 105 over the terrain 120 causes movement of the agricultural implement 110. In some examples, transport of the agricultural implement 110 by the prime mover 105 causes a negligible kinematic imbalance, for instance when the prime mover 105 traverses over the consistent terrain. The suspension control system 170 optionally has a first damping e.g., stiff damping) configuration when the prime mover 105 traverses over consistent terrain.

In another example, transport of the agricultural implement 110 increases the kinematic imbalance, and the kinematic imbalance exceeds the imbalance threshold. The increase in the kinematic imbalance causes the agricultural implement 110 to move (e.g., by causing the booms 130 to sway). The kinematic imbalance is optionally measured by the sensors 140C, 140D, and the semi-active suspension system 170 graduates the specified damping characteristics to damp the movement of the agricultural implement 110. Accordingly, and in some examples, the semi-active suspension system 170 directs the damping configuration by comparing the kinematic imbalance to the imbalance threshold. As a result, the suspension control system 170 optionally has a second damping configuration (e.g., soft damping) when the prime mover 105 traverses over uneven terrain or when the kinematic imbalance exceeds the imbalance threshold.

In an example, the semi-active suspension control system 170 maintains a gap between the agricultural implement 110 (e.g., the booms 130) and the terrain 120 (shown in FIG. 1A). For example, the suspension control circuit 170 is in communication with the proximity sensors 180, for instance a first proximity sensor 180A and a second proximity sensor 180B. The proximity sensors 180 measure the gap (e.g, spacing, distance, dimension, or the like) between the agricultural implement 110 and the terrain 120. For example, the suspension control circuit 175 operates the actuators 130 to maintain the gap between the agricultural implement 110 and the terrain 120 within a gap range (e.g., 18 inches to 24 inches, two feet, a meter, or the like).

Figure 6:
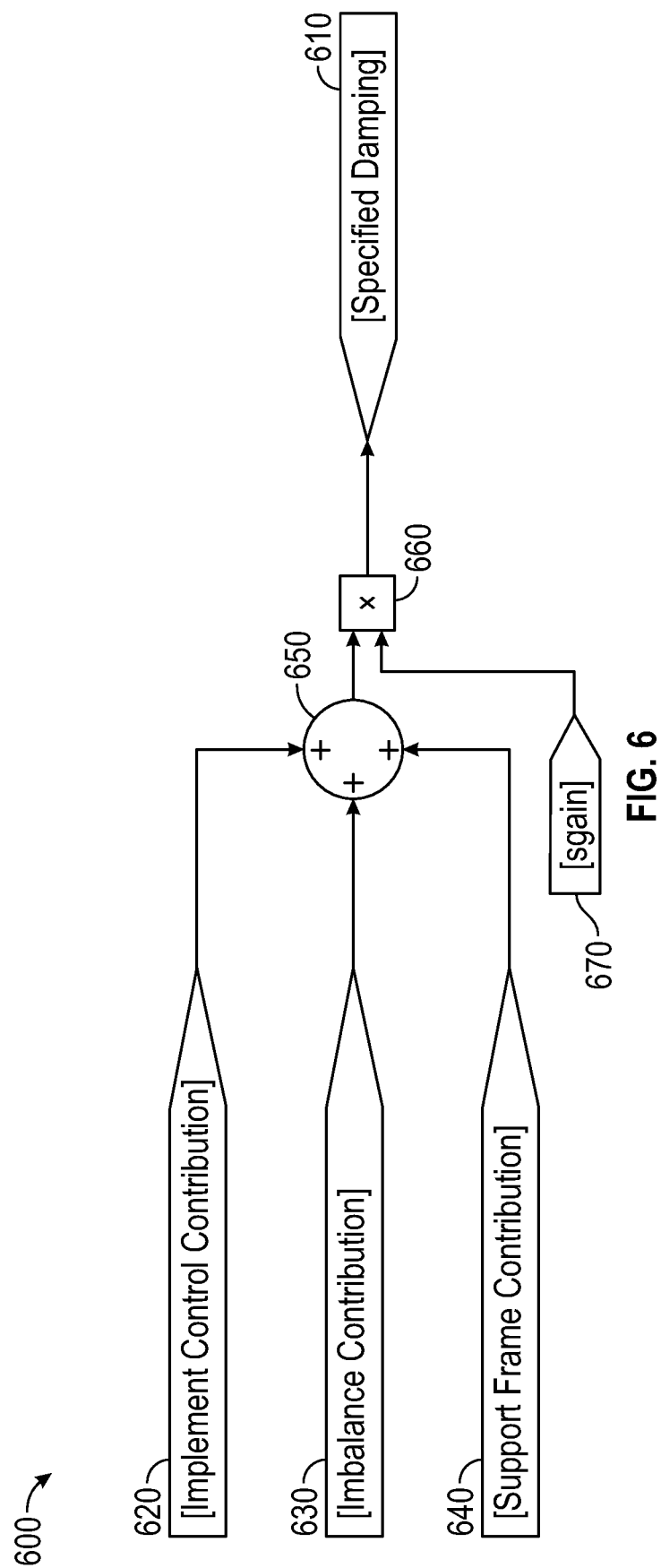
FIG. 6 is a schematic view of an algorithm for measuring or determining a specified damping characteristic.

FIG. 6 is a schematic view of an algorithm 600 for determining a specified damping characteristic. The algorithm 600 has one or more kinematic characteristics as inputs and combines one or more of the kinematic characteristics to generate a specified damping characteristic 610. For example, an implement control contribution 620 corresponds to the kinematic characteristics of the agricultural implement 110, for instance a force applied by the actuators 150 to the booms 130 (shown in FIGS. 1A, 1B). An imbalance contribution 630 is optionally included as an input to the algorithm 630. For example, the kinematic imbalance determined by the kinematic imbalance circuit 505 is an input into the algorithm 600. In another example, the support frame contribution 640 is an input to the algorithm 600. For example, the support frame contribution 640 corresponds to measured or determined kinematic characteristics of the implement support frame 115 (shown in FIGS. 1A, 1B).

The contributions 620, 630, 640 to the algorithm 600 are combined 650 (e.g., added) to determine the specified damping coefficient 610. In an example, a multiplier 660 modifies the combined 650 contributions 620, 630, 640 to change the specified damping coefficient 610. For example, the specified damping coefficient is modified with a gain 670 depending upon the terrain 120 being traversed by the chassis 100 (shown in FIG. 1A), In another example, the multiplier 660 facilitates tuning of the semi-active suspension system 170 (shown in FIG. 5).

Figure 7:
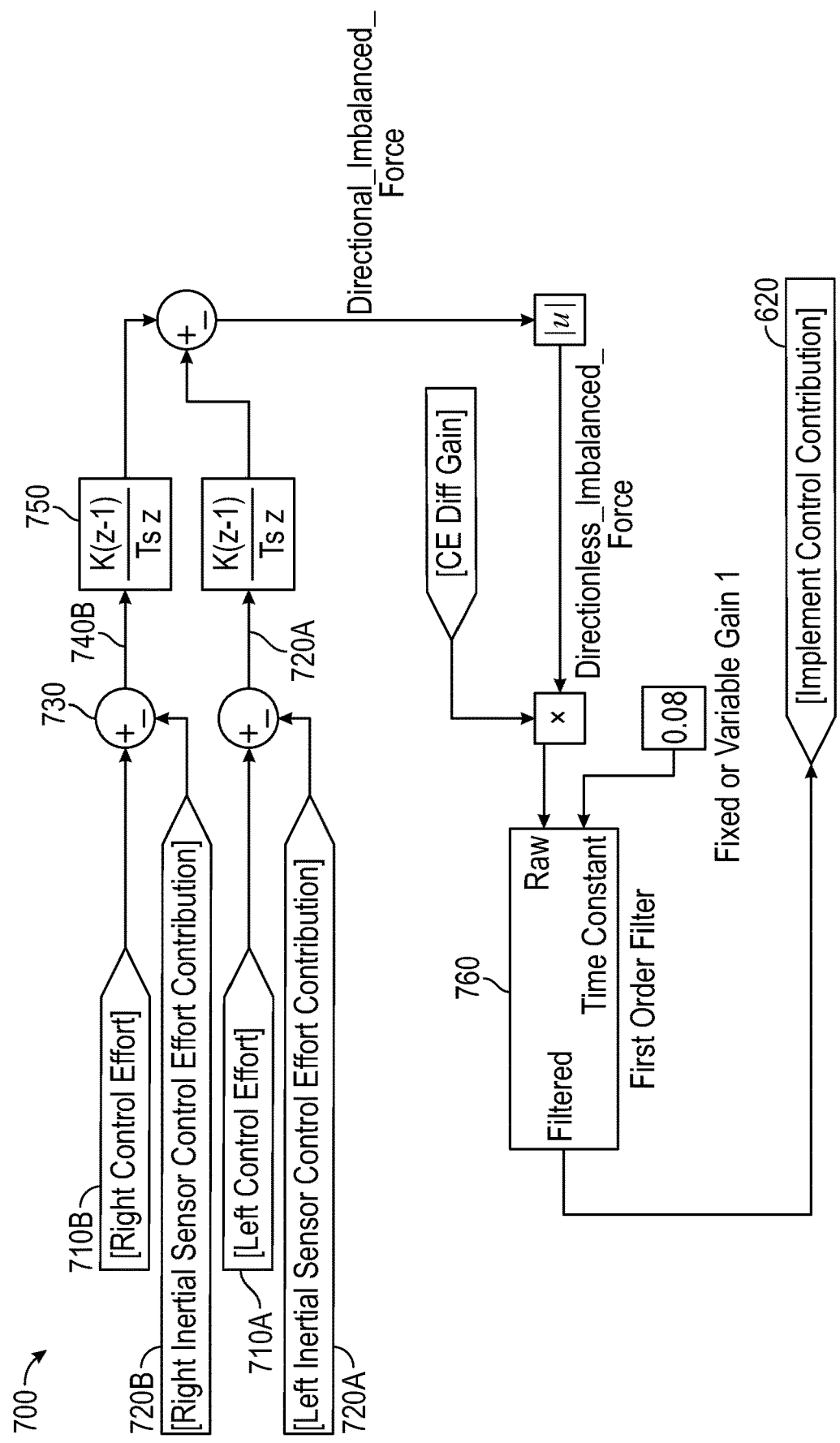
FIG. 7 is a schematic diagram of an algorithm for determining kinematic characteristics.

FIG. 7 is a schematic diagram of an algorithm 700 for determining kinematic characteristics. As described herein, the implement control contribution 620 corresponds to the kinematic characteristics of the agricultural implement 110, for instance a force applied by the actuators 150 to the booms 130 (shown in FIGS. 1A, 1B). In an example, the left and right control efforts 710A, 710B (e.g., an electrical signal, a voltage, a current, or the like) correspond to the force generated by the actuators 150. Inertial contributions 720A, 720B are determined (e.g., with the kinematic sensors 510C, 510D shown in FIG. 5) and the inertial contributions are combined 730 with the control efforts 710A, 710B to determine boom control inputs 740A, 740B. The boom control inputs 740A, 740B correspond to kinematic characteristics of the booms 130 relative to one or more of the chassis 100 and the implement support frame 115.

As further shown in FIG. 7, derivative elements 750 are provided with one or more of the kinematic characteristic inputs. In this example, derivative elements 150 are associated with the boom control inputs 740A, 740B. The derivative elements generate rates of change (speeds or velocities) for each of these characteristic values to facilitate summation 760 and thereby determine a composite kinematic characteristic (e.g., value). Accordingly, the derivative elements 750 (e.g. rate of change circuit 502) facilitate conversion of dissimilar kinematic characteristics (e.g., position and velocity) to allow for comparison or evaluation of the dissimilar kinematic characteristics in the algorithm 600.

The corresponding derived values are, in another example, subject to low pass filters 770 (e.g., included in the suspension control circuit 175, shown in FIG. 5) to smooth the values prior to summation, for instance by removing spikes, errant values or the like in the velocities or angles that otherwise skew the values used to generate the specified damping coefficient 610. Accordingly, the algorithm 700 generates a corresponding kinematic characteristic including, for this example, the implement control contribution 620.

Figure 8:
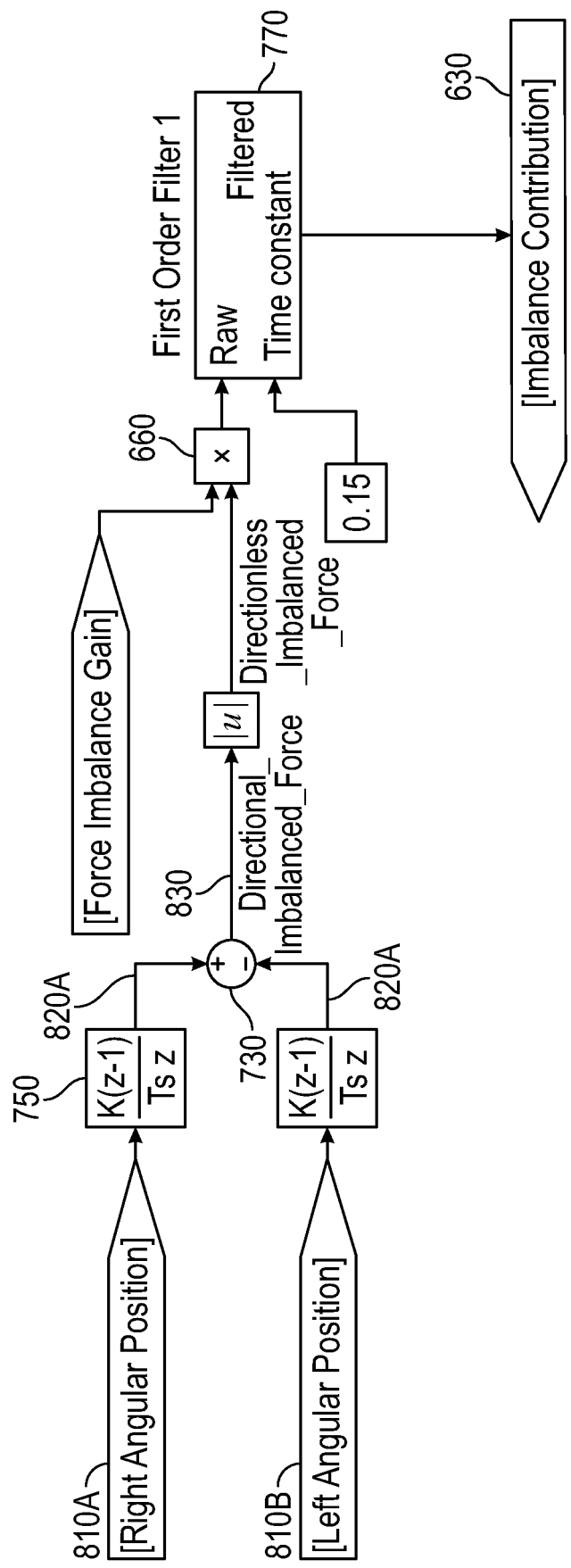
FIG. 8 is a schematic diagram of another algorithm for determining kinematic characteristics.

FIG. 8 is a schematic diagram of another algorithm 800 for determining kinematic characteristics. In an example, the imbalance contribution 630 is included as an input to the algorithm 600 and corresponds to the kinematic imbalance determined by the kinematic imbalance circuit 505 is an input into the algorithm 600. In an example inputs to the imbalance contribution 640 include left and right angular positions 810A, 810B of the agricultural implement, for example the angular position of one or more of the booms 130.

The derivative elements 750 determine a rate of change of the angular positions 810A, 810B, and accordingly determine the angular velocity of the agricultural implement 110, for example left and right angular velocity inputs 820A, 820B. The angular velocity inputs are summed 760 to determine if a kinematic imbalance 830 is incident upon one or more the chassis 100 or the implement support frame 115.

In an example, the multiplier 660 facilitates tuning of the semi-active suspension system 170 (shown in FIG. 5), for instance by allowing tuning of kinematic imbalance 830 and the imbalance contribution 630 to the algorithm 600. In another example, the low pass filters 770 to smooth the values prior to summation, for instance by removing spikes, errant values or the like in the velocities or angles that otherwise skew the values used to generate the imbalance contribution 630.

Figure 9:
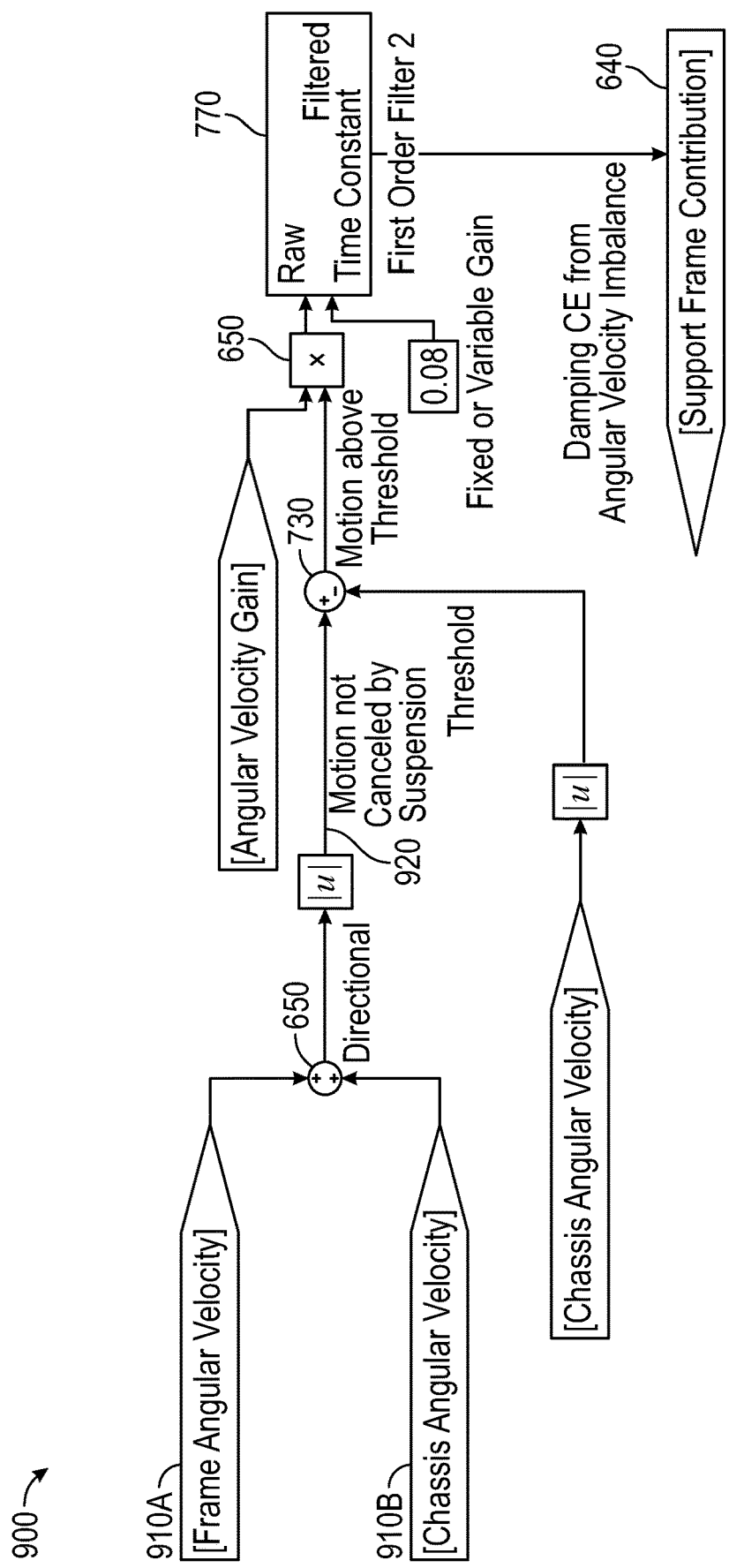
FIG. 9 is a schematic diagram of yet another algorithm for determining kinematic characteristics.

FIG. 9 is a schematic diagram of yet another algorithm 900 for determining kinematic characteristics. As described herein, the support frame contribution 640 is an input to the algorithm 600. For example, the support frame contribution 640 corresponds to measured or determined kinematic characteristics of the implement support frame 115 (shown in FIGS. 1A, 1B), In an example, an angular velocity 910A of the implement support frame 100 is an input to the algorithm 900. Additionally, an angular velocity 910B of the chassis 100 is an input to the algorithm 900.

The angular velocities 910A, 910B are combined 650, for instance to determine the motion not reduced 920 by the semi-active suspension system 170. In an example, the chassis 100 and the implement support frame 115 are rotating in the direction of arrow 300 (shown in FIG. 3). Accordingly, the angular velocities 910A, 910B are combined and are moving in the same direction. In another example, the chassis 100 is rotating in the direction of the arrow 200 (shown in FIG. 2), and the implement support frame 115 is rotating in the direction of the arrow 300. Accordingly, the semi-active suspension system 170 reduces the transmission of motion of the chassis 100 to the implement support frame 115.

The motion not reduced 920 by the semi-active suspension system 170 is optionally summed 730 with the angular velocity 910B of the chassis 100, for example to provide a threshold value for whether to damp motion of the implement support frame 115 relative to the chassis 100. The summation 730 of the angular velocity 910B with the motion not reduced 920 by the system 170 reduced noise that is input into the support frame contribution 640 and the algorithm 600. Accordingly, the damping performance of the system 170 is thereby improved, for instance by reducing motion of the agricultural implement relative to the terrain 120.

In an example, the multiplier 660 facilitates tuning of the semi-active suspension system 170 (shown in FIG. 5), for instance by allowing tuning of the support frame contribution 640 to the algorithm 600. In another example, the low pass filters 770 to smooth the values prior to summation, for instance by removing spikes, errant values or the like in the velocities or angles that otherwise skew the values used to generate support frame contribution 640.

The algorithms 600, 700, 8OO, 900 are optionally included as instructions that cause the suspension control circuit 170 to perform one or more of the functions described herein.

Figure 10:
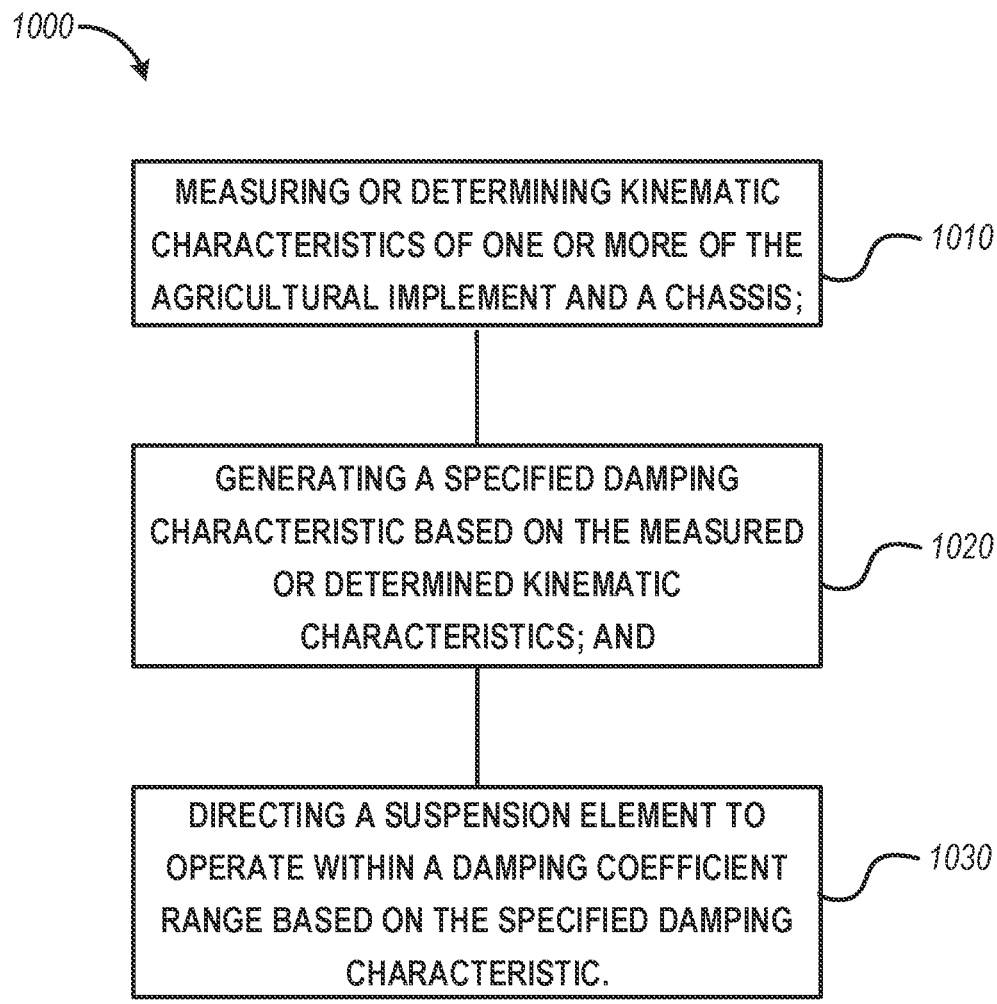
FIG. 10 shows one example of a method for kinematic damping of an agricultural implement.

FIG. 10 shows one example of a method 1000 for kinematic damping of an agricultural implement, including one or more of the semi-active suspension system 100 described herein. In describing the method 1000, reference is made to one or more components, features, functions and operations previously described herein. Where convenient, reference is made to the components, features, operations and the like with reference numerals. The reference numerals provided are exemplary and are not exclusive. For instance, components, features, functions, operations and the like described in the method 1000 include, but are not limited to, the corresponding numbered elements provided herein and other corresponding elements described herein (both numbered and unnumbered) as well as their equivalents.

At 1010, kinematic characteristics of one or more of the agricultural implement 110 and the chassis 100 are measured or determined. At 1020, a specified damping characteristic is generated based on the measured or determined kinematic characteristics. At 1030, a suspension element is directed to operate within a damping coefficient range based on the specified damping characteristic.

Several options for the method 1000 follow. For example, a kinematic imbalance incident on one or more of the agricultural implement 110 and the chassis 100 is determined according to the measured or determined kinematic characteristics. In another example, kinematics incident upon one or more of the chassis and the agricultural implement are balanced based on the measured or determined kinematic characteristics. In some examples, balancing kinematics includes graduating the specified damping characteristic.

Figure 11:
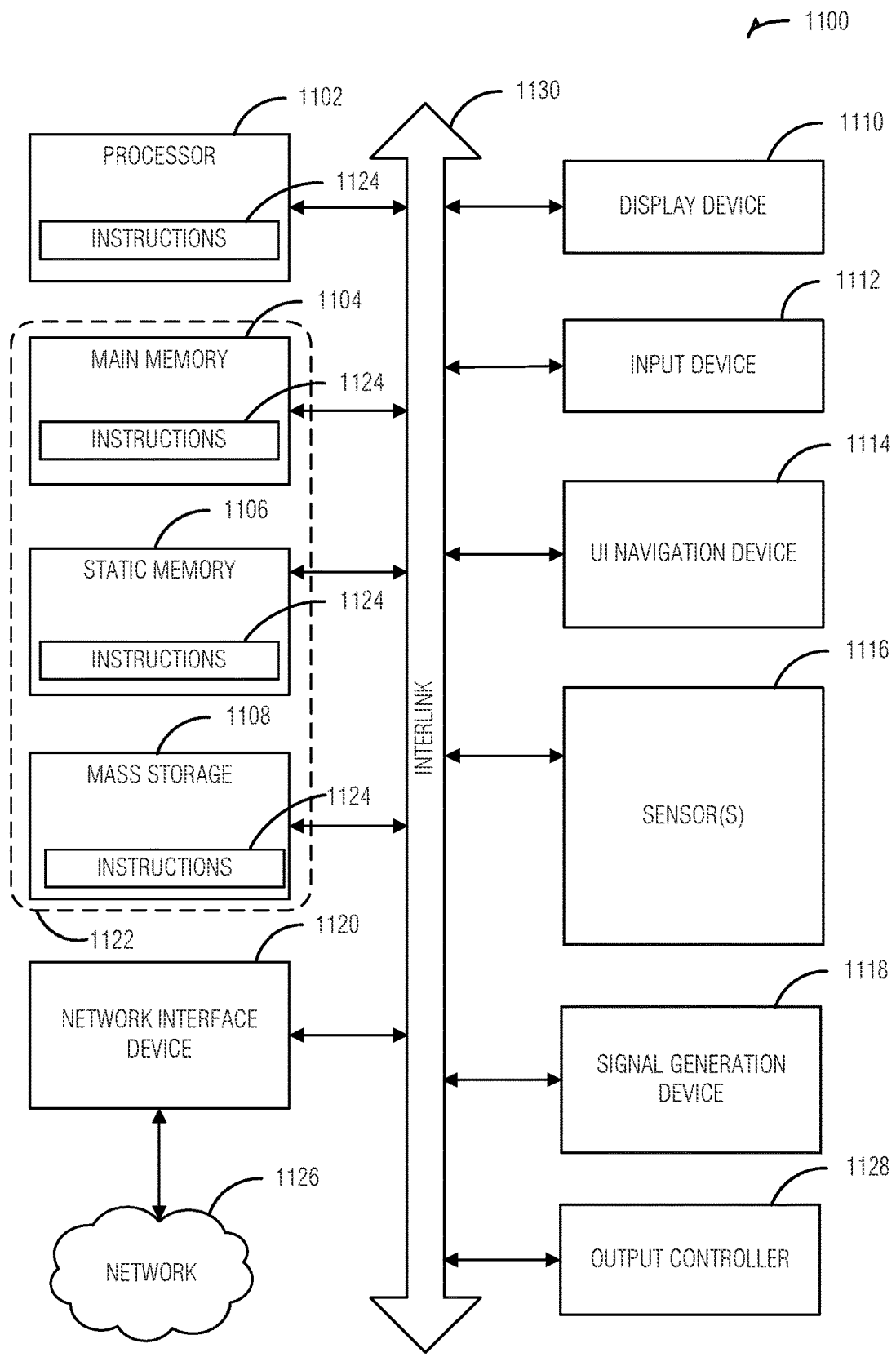
FIG. 11 illustrates a block diagram of an example machine.

FIG. 11 illustrates a block diagram of an example machine 1100 upon which any one or more of the techniques (e.g., methodologies) discussed herein may perform. Examples, as described herein, may include, or may operate by, logic or a number of components, or mechanisms in the machine 1100. Circuitry (e.g., processing circuitry, the suspension control circuit 130, or the like) is a collection of circuits implemented in tangible entities of the machine 1100 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1100 follow.

In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1100 may include a hardware processor 1102 (e.g., a central processing unit (CPU), a graphics processing unit (GPU), a hardware processor core, or any combination thereof), a main memory 1104, a static memory (e.g., memory or storage for firmware, microcode, a basic-input-output (BIOS), unified extensible firmware interface (UEFI), etc.) 1106, and mass storage 1108 (e.g., hard drive, tape drive, flash storage, or other block devices) some or all of which may communicate with each other via an interlink (e.g., bus) 1130. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1108, a signal generation device 1118 (e.g., a speaker), a network interface device 1120, and one or more sensors 1116, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1102, the main memory 1104, the static memory 1106, or the mass storage 1108 may be, or include, a machine readable medium 1122 on which is stored one or more sets of data structures or instructions 1124 (e.g., software, or the algorithms 600, 700, 800, 900 or the like) embodying or utilized by any one or more of the techniques or functions described herein. The instructions 1124 may also reside, completely or at least partially, within any of registers of the processor 1102, the main memory 1104, the static memory 1106, or the mass storage 1108 during execution thereof by the machine 1100. In an example, one or any combination of the hardware processor 1102, the main memory 1104, the static memory 1106, or the mass storage 1108 may constitute the machine readable media 1122. While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g.; Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may be further transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software. A transmission medium is a machine readable medium.

Various Notes & Aspects

Aspect 1 may include or use subject matter (such as an apparatus, a system, a device, a method, a means for performing acts, or a device readable medium including instructions that, when performed by the device, may cause the device to perform acts), such as may include or use a semi-active suspension system comprising: a suspension element having a damping coefficient range, the suspension element includes: an implement end configured for coupling with an agricultural implement; and a chassis end configured for coupling with a chassis; and a suspension control circuit in communication with the suspension element, the suspension control circuit includes: a kinematic assessment circuit in communication with one or more sensors, the kinematic assessment circuit configured to measure or determine kinematic characteristics of one or more of the agricultural implement and the chassis; and a damping control circuit configured to: generate a specified damping characteristic based on the measured or determined kinematic characteristics; and direct the suspension element to operate within the damping coefficient range based on the specified damping characteristic.

Aspect 2 may include or use, or may optionally be combined with the subject matter of Aspect 1, to optionally include or use wherein the suspension control circuit includes: a kinematic imbalance circuit configured to determine a kinematic imbalance of the forces incident on the agricultural implement according to the measured or determined kinematic characteristics; and the damping control circuit is further configured to generate the specified damping characteristic based on the determined kinematic imbalance.

Aspect 3 may include or use, or may optionally be combined with the subject matter of Aspect 2 to optionally include or use wherein the kinematic imbalance circuit is configured to determine the kinematic imbalance with: a first rate of change circuit configured to determine the rate of change of a first characteristic of the measured kinematic characteristics associated with forces incident on the agricultural implement; and a second rate of change circuit configured to determine the rate of change of a second characteristic of the measured kinematic characteristics associated with forces incident on the agricultural implement.

Aspect 4 may include or use, or may optionally be combined with the subject matter of Aspect 3 to optionally include or use wherein the first characteristic includes a first velocity of a first portion of the agricultural implement and a second velocity of a second portion of the agricultural implement, and the second characteristic includes a first position of a first portion of the agricultural implement and a second position of a second portion of the agricultural implement.

Aspect 5 may include or use, or may optionally be combined with the subject matter of Aspect 4 to optionally include or use wherein the rate of the change of the second characteristic includes at least two derivatives of each of the first position and the second position.

Aspect 6 may include or use, or may optionally be combined with the subject matter of one or any combination of Aspects 1 through 5 to optionally include or use wherein the one or more sensors configured to measure the kinematic characteristics include one or more of a position sensor, velocity sensor, acceleration sensor, jerk sensor, force sensor or torque sensor.

Aspect 7 may include or use, or may optionally be combined with the subject matter of one or any combination of Aspects 1 through 6 to optionally include or use wherein the one or more kinematic characteristics of the agricultural implement include implement position, implement velocity, implement acceleration, implement jerk, and force effort applied to the implement.

Aspect 8 may include or use, or may optionally be combined with the subject matter of one or any combination of Aspects 1 through 7 to optionally include or use wherein the one or more kinematic characteristics of the chassis include chassis position, chassis velocity, chassis acceleration, chassis jerk, and force effort applied to the chassis.

Aspect 9 may include or use, or may optionally be combined with the subject matter of one or any combination of Aspects 1 through 8 to optionally include or use wherein the suspension control circuit is configured to generate the specified damping characteristic between a floor damping characteristic and a ceiling damping characteristic, and the generated specified damping characteristic corresponds to a damping coefficient between a floor damping coefficient and a ceiling damping coefficient within the range of damping coefficients.

Aspect 10 may include or use, or may optionally be combined with the subject matter of Aspect 9 to optionally include or use wherein the suspension element is configured to operate across a range of damping characteristics corresponding to the range of the floor and ceiling of the damping coefficients for a plurality of specified damping configurations.

Aspect 11 may include or use, or may optionally be combined with the subject matter of one or any combination of Aspects 9 or 10 to optionally include or use wherein the plurality of specified damping configurations each include a different damping coefficient, and the suspension control circuit is configured to graduate the specified damping characteristic based on the measured or determined kinematic characteristics; and select a damping configuration and associated damping coefficient from the plurality of damping configurations according to the one or more kinematic characteristics of the agricultural implement.

Aspect 12 may include or use, or may optionally be combined with the subject matter of Aspect 11 to optionally include or use wherein the specified damping characteristic increases in proportion to an increase in a determined kinetic imbalance.

Aspect 13 may include or use, or may optionally be combined with the subject matter of one or any combination of Aspects 11 or 12 to optionally include or use wherein the first specified damping characteristic decreases in proportion to a decrease in a determined kinetic imbalance.

Aspect 14 may include or use, or may optionally be combined with the subject matter of one or any combination of Aspects H through 13 to optionally include or use wherein the suspension control circuit graduates the specified damping characteristic based on the measured or determined kinematic characteristics.

Aspect 15 may include or use, or may optionally be combined with the subject matter of one or any combination of Aspects 1 through 14 to optionally include or use a first sensor is in communication with the suspension control circuit, and the first sensor is configured to measure kinematic characteristics of the agricultural implement relative to the chassis; and a second sensor is in communication with the suspension control circuit, and the second sensor is configured to measure kinematic characteristics of the chassis.

Aspect 16 may include or use, or may optionally be combined with the subject matter of one or any combination of Aspects 1 through 15 to optionally include or use wherein the agricultural implement includes a sprayer, harvester, planter, baler or swather.

Aspect 17 may include or use, or may optionally be combined with the subject matter of one or any combination of Aspects 1 through 16 to optionally include or use wherein the agricultural implement includes a sprayer boom.

Aspect 18 may include or use, or may optionally be combined with the subject matter of one or any combination of Aspects 1 through 17 to optionally include or use wherein the agricultural implement includes the implement support frame.

Aspect 19 may include or use, or may optionally be combined with the subject matter of one or any combination of Aspects 1 through 18 to optionally include or use wherein the suspension element includes a hydraulic cylinder with a modulating accumulator; and the suspension control circuit operates a valve opening of the modulating accumulator based on the specified damping characteristic.

Aspect 20 may include or use, or may optionally be combined with the subject matter of one or any combination of Aspects 1 through 19 to optionally include or use wherein the chassis is a prime mover chassis or a trailer chassis.

Aspect 21 may include or use subject matter (such as an apparatus, a system, a device, a method, a means for performing acts, or a device readable medium including instructions that, when performed by the device, may cause the device to perform acts), such as may include or use a semi-active suspension system comprising: an agricultural implement including: a first sprayer boom; an implement support frame configured to: couple with a chassis, wherein the implement support frame has one or more degrees of freedom relative to the chassis when the implement frame is coupled to the chassis; support the first sprayer boom; and wherein the sprayer boom is moveable relative to the implement support frame; a first suspension element having a damping coefficient range and operable between a plurality of damping configurations within the damping coefficient range, the first suspension element including: a first implement end configured for coupling with the first agricultural implement; a first chassis end configured for coupling with the chassis; and a suspension control circuit configured to generate a specified damping characteristic and direct the first suspension element to operate between the plurality of damping configurations based on the specified damping characteristic.

Aspect 22 may include or use, or may optionally be combined with the subject matter of Aspect 21, to optionally include or use a kinematic assessment circuit included in the suspension control circuit and in communication with one or more sensors, the kinematic assessment circuit configured to measure or determine kinematic characteristics of one or more of the agricultural implement and the chassis; and a second suspension element having a second specified damping characteristic, the second suspension element including: a second chassis end configured for coupling with the chassis; and a second implement end configured for coupling with the agricultural implement.

Aspect 23 may include or use, or may optionally be combined with the subject matter of Aspect 22 to optionally include or use wherein the suspension control circuit includes a balancing circuit, and the balancing circuit is configured to graduate the first specified damping characteristic and the second specified damping characteristic to balance forces incident upon the implement support frame based off the measured or determined kinematic characteristics.

Aspect 24 may include or use, or may optionally be combined with the subject matter of Aspect 23 to optionally include or use wherein: a first sensor is in communication with the suspension control circuit, and the first sensor is configured to measure a first set of kinematic characteristics of the chassis; a second sensor is in communication with the suspension control circuit, and the second sensor is configured to measure a second set of kinematic characteristics of the agricultural implement relative to the chassis; the kinematic imbalance circuit is configured to determine a kinematic imbalance by combining the first set of kinematic characteristics and the second set of kinematic characteristics; and the suspension control circuit is configured to graduate the first specified damping characteristic and the second specified damping characteristic in proportion to the determined kinematic imbalance.

Aspect 25 may include or use, or may optionally be combined with the subject matter of Aspect 24 to optionally include or use wherein the first specified damping characteristic and the second damping characteristic increases in proportion to an increase in the determined kinetic imbalance.

Aspect 26 may include or use, or may optionally be combined with the subject matter of one or any combination of Aspects 24 or 25 to optionally include or use wherein the first specified damping characteristic and the second damping characteristic decreases in proportion to a decrease in the determined kinetic imbalance.

Aspect 27 may include or use, or may optionally be combined with the subject matter of one or any combination of Aspects 24 through 26 to optionally, include or use wherein the suspension control circuit compares the kinematic imbalance to an imbalance threshold, and the suspension control circuit graduates the first specified damping characteristic and the second specified damping characteristic if the kinematic imbalance exceeds the imbalance threshold.

Aspect 28 may include or use, or may optionally be combined with the subject matter of one or any combination of Aspects 22 through 27 to optionally include or use wherein the suspension control circuit includes a balancing circuit, and the balancing circuit is configured to graduate the first specified damping characteristic and the second specified damping characteristic to inhibit movement of the implement support frame relative to the chassis.

Aspect 29 may include or use, or may optionally be combined with the subject matter of one or any combination of Aspects 21 through 28 to optionally include or use a second sprayer boom; a second suspension element having a second specified damping characteristic, the second suspension element including: a second implement end configured for coupling with the agricultural implement; a second chassis end configured for coupling with the chassis; and wherein the suspension control circuit includes a balancing circuit, and the balancing circuit is configured to graduate the first specified damping characteristic and the second specified damping characteristic to balance forces incident upon the agricultural implement.

Aspects 30 may include or use, or may optionally be combined with the subject matter of Aspect 29 to optionally include or use the suspension control circuit is in communication with a first actuator configured to provide a force to control the position of the first sprayer boom relative to the implement support frame; the suspension control circuit is in communication with a second actuator configured to provide a force to control the position of the second sprayer boom relative to the implement support frame; a first sensor is in communication with the suspension control circuit, and the first sensor is configured to measure a first set of kinematic characteristics of the first sprayer boom relative to the chassis; and a second sensor is in communication with the suspension control circuit, and the second sensor is configured to measure a second set of kinematic characteristics of the second sprayer boom relative to the chassis.

Aspect 31 may include or use, or may optionally be combined with the subject matter of one or any combination of Aspects 29 through 31 to optionally include or use wherein the balancing circuit is configured to determine a kinematic imbalance by combining the first set of kinematic characteristics and the second set of kinematic characteristics; and the suspension control circuit is configured to graduate the first specified damping characteristic and the second specified damping characteristic in proportion to the determined kinematic imbalance.

Aspect 32 may include or use, or may optionally be combined with the subject matter of one or any combination of Aspects 29 through 31 to optionally include or use wherein the suspension control circuit is configured to control the first actuator to move the agricultural implement relevant to the terrain and maintain the first gap within a gap range.

Aspect 33 may include or use, or may optionally be combined with the subject matter of one or any combination of Aspects 29 through 32 to optionally include or use a first sensor is in communication with the suspension control circuit, and the first sensor is configured to measure a first set of kinematic characteristics of the first sprayer boom relative to the chassis; a second sensor is in communication with the suspension control circuit, and the second sensor is configured to measure a second set of kinematic characteristics of the second sprayer boom relative to the chassis; and a third sensor is in communication with the suspension control circuit, and the third sensor is configured to measure a second set of kinematic characteristics of the implement support frame relative to the chassis.

Aspect 34 may include or use, or may optionally be combined with the subject matter of Aspect 33 to optionally include or use wherein the balancing circuit is configured to determine a kinematic imbalance by combining the first set of kinematic characteristics, the second set of kinematic characteristics, and the third set of kinematic characteristics; and the suspension control circuit is configured to graduate the first specified damping characteristic and the second specified damping characteristic in proportion to the determined kinematic imbalance.

Aspect 35 may include or use, or may optionally be combined with the subject matter of one or any combination of Aspects 29 through 34 to optionally include or use wherein the kinematic characteristics includes one of: a force applied to the first sprayer boom or the second sprayer boom; an angular position of the first sprayer boom or the second sprayer boom; an angular velocity of the first sprayer boom or the second sprayer boom; an angular acceleration of the first sprayer boom or the second sprayer boom; or an angular jerk of the first sprayer boom or the second sprayer boom.

Aspect 36 may include or use, or may optionally be combined with the subject matter of one or any combination of Aspects 21 through 35 to optionally include or use wherein the first suspension element includes a magnetorheological material, and the suspension control circuit graduates the first specified damping characteristic by changing a magnetic field applied to the magnetorheological material.

Aspect 37 may include or use, or may optionally be combined with the subject matter of one or any combination of Aspects 21 through 36 to optionally include or use wherein the first implement end is coupled to the implement support frame.

Aspect 38 may include or use subject matter such as an apparatus, a system, a device, a method, a means for performing acts, or a device readable medium including instructions that, when performed by the device, may cause the device to perform acts), such as may include or use a semi-active suspension system comprising: a first suspension element having a first specified damping characteristic and a second specified damping characteristic, the first suspension element includes an implement end configured for coupling with an agricultural implement; a suspension control circuit in communication with the first suspension element, the suspension control circuit includes: a kinematic measurement circuit in communication with one or more sensors configured to measure kinematic characteristics of the agricultural implement, a damping control circuit is configured to determine a graduated damping coefficient based on the measured kinematic characteristics, and utilizes the graduated damping coefficient as the first specified damping characteristic and the second specified damping characteristic of the suspension element, and wherein the suspension control circuit is configured to control the specified damping characteristic between a plurality of damping configurations.

Aspect 39 may include or use, or may optionally be combined with the subject matter of Aspect 38, to optionally include or use wherein the plurality of damping configurations includes: a first damping configuration with a first specified damping characteristic, wherein the first damping configuration is configured for uneven terrain; a second damping configuration with a second specified damping characteristic, wherein the second damping configuration is configured for consistent terrain.

Aspect 40 may include or use, or may optionally be combined with the subject matter of Aspect 39 to optionally include or use wherein: in the first damping configuration the first suspension element is stiff; and in the second damping configuration the first suspension element is soft.

Aspect 41 may include or use, or may optionally be combined with the subject matter of one or any combination of Aspects 38 through 40 to optionally include or use wherein the suspension control circuit includes a coefficient graduation circuit configured to graduate the first specified damping characteristic or the second specified damping characteristic according to a determined kinematic imbalance that is measured according to kinematic characteristics of one or more of a chassis or the agricultural implement.

Aspect 42 may include or use subject matter (such as an apparatus, a system, a device, a method, a means for performing acts, or a device readable medium including instructions that, when performed by the device, may cause the device to perform acts), such as may include or use a method for damping motion of an agricultural implement, including: measuring or determining kinematic characteristics of one or more of the agricultural implement and a chassis; generating a specified damping characteristic based on the measured or determined kinematic characteristics; and directing a suspension element to operate within a damping coefficient range based on the specified damping characteristic.

Aspect 43 may include or use, or may optionally be combined with the subject matter of Aspect 42, to optionally include or use determining a kinematic imbalance incident on one or more of the agricultural implement and the chassis according to the measured or determined kinematic characteristics.

Aspect 44 may include or use, or may optionally be combined with the subject matter of one or any combination of Aspects 42 or 43 to optionally include or use balancing kinematics incident upon one or more of the chassis and the agricultural implement based on the measured or determined kinematic characteristics.

Aspect 45 may include or use, or may optionally be combined with the subject matter of Aspect 44 to optionally include or use wherein balancing kinematics includes graduating the specified damping characteristic.

Aspect 46 may include or use, or may optionally be combined with any portion or combination of any portions of any one or more of Aspects 1 through 45 to include or use, subject matter that may include means for performing any one or more of the functions of Aspects 1 through 45, or a machine-readable medium including instructions that, when performed by a machine, cause the machine to perform any one or more of the functions of Aspects 1 through 45.

Each of these non-limiting aspects can stand on its own, or can be combined in various permutations or combinations with one or more of the other aspects.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A semi-active suspension system comprising:
   a suspension element having a variable suspension force, the suspension element configured for coupling between a chassis and a boom configured to apply an agricultural product; and
   a suspension control processor in communication with the suspension element, the suspension control processor including:
      a kinematic assessment circuit in communication with one or more sensors, the kinematic assessment circuit configured to evaluate kinematic characteristics of one or more of the boom, implement support frame, or the chassis; and
      a suspension control circuit configured to direct the suspension element to operate with the variable suspension force based on the evaluated kinematic characteristics.

2. The semi-active suspension system of claim 1, wherein the variable suspension force is configured to compensate for a kinematic load incident upon one or more of the chassis, the agricultural implement, or the implement support frame.

3. The semi-active suspension system of claim 1, wherein the variable suspension force includes a damping coefficient range, and the suspension control processor is configured to direct the suspension element to operate within the damping coefficient range and change the variable suspension force.

4. The semi-active suspension system of claim 1, further comprising the chassis and the implement support frame.

5. The semi-active suspension system of claim 4, wherein the suspension element is coupled between the chassis and the implement support frame.

6. The semi-active suspension system of claim 4, further comprising the boom.

7. The semi-active suspension system of claim 6, wherein the boom includes one or more of a first boom and a second boom.

8. The semi-active suspension system of claim 7, wherein the implement support frame is coupled between the first boom and the second boom.

9. The semi-active suspension system of claim 6, wherein the boom is coupled with implement support frame.

10. The semi-active suspension system of claim 4, further comprising one or more kinematic sensors configured to measure kinematic characteristics.

11. The semi-active suspension system of claim 10, wherein the one or more kinematic sensors includes a first kinematic sensor coupled with the chassis.

12. The semi-active suspension system of claim 11, wherein the one or more kinematic sensors includes a second kinematic sensor coupled with one or more of the boom or the implement support frame.

13. The semi-active suspension system of claim 1, further comprising the chassis and the boom.

14. The semi-active suspension system of claim 13, wherein the suspension element is coupled between the chassis and the boom.

15. A semi-active suspension system comprising:
   a chassis;
   an implement support frame coupled with the chassis;
   a boom coupled with the implement support frame, wherein the boom is configured to apply an agricultural product;
   a suspension element having a variable suspension force, the suspension element coupled between the chassis and one or more of the boom or the implement support frame;
   one or more sensors configured to measure kinematic characteristics of one or more of the boom, the implement support frame, and the chassis; and
   a suspension control processor in communication with the suspension element, the suspension control processor including:
      a kinematic assessment circuit in communication with the one or more sensors, the kinematic assessment circuit configured to receive measurements of the one or more sensors or determine kinematic characteristics of one or more of the boom, implement support frame, or the chassis; and
      a suspension control circuit configured to direct the suspension element to operate with the variable suspension force based on the measured or determined kinematic characteristics.

16. The semi-active suspension system of claim 15, wherein the variable suspension force is configured to compensate for a kinematic load incident upon one or more of the chassis, the boom, or the implement support frame.

17. The semi-active suspension system of claim 15, wherein the variable suspension force includes a damping coefficient range, and the suspension control processor is configured to direct the suspension element to operate within the damping coefficient range and change the variable suspension force.

18. The semi-active suspension system of claim 15, wherein the one or more kinematic sensors includes a first kinematic sensor coupled with the chassis.

19. The semi-active suspension system of claim 18, wherein the one or more kinematic sensors includes a second kinematic sensor coupled with one or more of the boom or the implement support frame.

20. A method for operating a semi-active suspension system, the method comprising:
   measuring kinematic characteristics of one or more of a boom configured to apply an agricultural product, an implement support frame, or a chassis using at least one kinematic sensor;
   evaluating the kinematic characteristics using a suspension control processor; and
   directing a suspension element to operate with a variable suspension force based on the evaluated kinematic characteristics, wherein the suspension element is coupled between the chassis and one or more of the agricultural implement or the implement support frame.

21. The method of claim 20, wherein the variable suspension force is configured to compensate for a kinematic load incident upon one or more of the chassis, boom, or the implement support frame.

22. The method of claim 20, wherein the variable suspension force includes a damping coefficient range, and the method includes directing the suspension element to operate within the damping coefficient range and change the variable suspension force.

* * * * *

UNITED STATES PATENT AND TRADEMARK OFFICE
CERTIFICATE OF CORRECTION

| | |
|---|---|
| PATENT NO. | : 12,144,337 B2 |
| APPLICATION NO. | : 18/172671 |
| DATED | : November 19, 2024 |
| INVENTOR(S) | : Weidenbach et al. |

It is certified that error appears in the above-identified patent and that said Letters Patent is hereby corrected as shown below:

In the Specification

In Column 1, Line 28, delete "HELD" and insert --FIELD-- therefor

In Column 2, Line 31, delete "optionally," and insert --optionally-- therefor

In Column 3, Line 14, delete "obstacle," and insert --obstacle.-- therefor

In Column 4, Line 19, delete "FIG. 1," and insert --FIG. 1A.-- therefor

In Column 4, Line 54, delete "100" and insert --105-- therefor

In Column 5, Line 20, delete "1408," and insert --140B,-- therefor

In Column 5, Line 21, delete "140C," and insert --140C.-- therefor

In Column 6, Line 5, delete "150" and insert --115-- therefor

In Column 6, Line 56, delete "a, tree," and insert --a tree,-- therefor

In Column 6, Line 64, delete "1255." and insert --125.-- therefor

In Column 7, Line 7, delete "110" and insert --115-- therefor

In Column 7, Line 15, delete "110" and insert --115-- therefor

In Column 7, Line 28, delete "140" and insert --110-- therefor

In Column 7, Lines 30-31, delete "terrain thereby," and insert --terrain, thereby,-- therefor Signed and Sealed this
Ninth Day of December, 2025

John A. Squires
*Director of the United States Patent and Trademark Office*

CERTIFICATE OF CORRECTION (continued)
U.S. Pat. No. 12,144,337 B2

In Column 8, Line 36, delete "120," and insert --120.-- therefor

In Column 9, Line 12, delete "115" and insert --110-- therefor

In Column 11, Line 15, delete "support frame 110" and insert --implement support frame 115-- therefor In Column 11, Line 20, delete "501" and insert --504-- therefor In Column 12, Line 25, delete "e.g.," and insert --(e.g.,-- therefor In Column 12, Line 48, delete "170" and insert --175-- therefor In Column 12, Line 54, delete "130" and insert --150-- therefor In Column 13, Line 1, delete "630." and insert --600.-- therefor In Column 13, Line 16, delete "1A)," and insert --1A).-- therefor In Column 13, Line 38, delete "150" and insert --750-- therefor In Column 13, Line 64, delete "640" and insert --630-- therefor In Column 14, Line 23, delete "1B)," and insert --1B).-- therefor In Column 14, Line 24, delete "100" and insert --115-- therefor In Column 14, Line 60, delete "8OO," and insert --800,-- therefor In Column 14, Line 62, delete "170" and insert --175-- therefor In Column 14, Line 66, delete "100" and insert --170-- therefor In Column 15, Line 36, delete "130," and insert --175,-- therefor In Column 17, Line 19, delete "(e.g.;" and insert --(e.g.,-- therefor In Column 18, Lines 1-2, delete "suspension control circuit" and insert --suspension control circuit 175-- therefor In Column 19, Line 43, delete "Aspects H" and insert --Aspects 11-- therefor In Column 20, Line 8, delete "accumulator;" and insert --accumulator,-- therefor In Column 21, Line 22, delete "optionally," and insert --optionally-- therefor In Column 21, Line 50, delete "Aspects" and insert --Aspect-- therefor In Column 23, Line 1, delete "acts)," and insert --acts-- therefor In Column 25, Line 17, delete "§ 1.72(b)," and insert --§1.72(b),-- therefor